US012589338B2

(12) United States Patent
Kamba et al.

(10) Patent No.: US 12,589,338 B2
(45) Date of Patent: Mar. 31, 2026

(54) FILTER AND FILTER DEVICE

(71) Applicant: Murata Manufacturing Co., Ltd., Nagaokakyo (JP)

(72) Inventors: Seiji Kamba, Nagaokakyo (JP); Takashi Kondo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 723 days.

(21) Appl. No.: 17/901,171

(22) Filed: Sep. 1, 2022

(65) Prior Publication Data

US 2023/0073215 A1 Mar. 9, 2023

Related U.S. Application Data

(63) Continuation of application No. PCT/JP2020/047500, filed on Dec. 18, 2020.

(30) Foreign Application Priority Data

Mar. 17, 2020 (JP) ................................. 2020-046135

(51) Int. Cl.
B01D 25/22 (2006.01)
B01D 29/11 (2006.01)

(52) U.S. Cl.
CPC ............ B01D 25/22 (2013.01); B01D 29/111 (2013.01)

(58) Field of Classification Search
CPC ...... B01D 25/22; B01D 29/111; B01D 29/03; B01D 39/20; C12M 1/12; C12M 1/26; C12M 3/06; G01N 1/10
See application file for complete search history.

(56) References Cited

U.S. PATENT DOCUMENTS

| | | | |
|---|---|---|---|
| 10,858,624 B2 | 12/2020 | Banju et al. | |
| 2018/0243672 A1 | 8/2018 | Banju et al. | |
| 2020/0102531 A1 | 4/2020 | Banju et al. | |

FOREIGN PATENT DOCUMENTS

| | | | | | |
|---|---|---|---|---|---|
| CN | 108884431 A | * | 11/2018 | ............. | B01D 29/01 |
| JP | 2006346530 A | | 12/2006 | | |
| JP | 6249124 B1 | | 12/2017 | | |
| JP | 2019058846 A | | 4/2019 | | |

(Continued)

OTHER PUBLICATIONS

International Search Report in PCT/JP2020/047500, mailed Mar. 2, 2021, 3 pages.

*Primary Examiner* — Waqaas Ali
(74) *Attorney, Agent, or Firm* — ArentFox Schiff LLP

(57) ABSTRACT

A filter that includes a filter base portion having a first main surface and a second main surface opposite to the first main surface, the filter base portion defining multiple first through-holes and one or multiple second through-holes penetrating between the first main surface and the second main surface, the one or multiple second through-holes being larger in size than the multiple first through-holes. The filter base portion having a first region on a center side of a filter, a second region on an outer periphery side of the filter relative to the first region, and a third region between the second region and an outer periphery of the filter. The one or multiple second through-holes are in the second region, and a ratio of an opening area of the one or multiple second through-holes is less than a ratio of an opening area of the multiple first through-holes.

12 Claims, 20 Drawing Sheets

(56) References Cited

FOREIGN PATENT DOCUMENTS

| JP | 2019098272 | A | | 6/2019 | | |
| WO | WO-2016140183 | A1 | * | 9/2016 | ............ | B01D 29/01 |
| WO | 2018042944 | A1 | | 3/2018 | | |

* cited by examiner

FIG. 12

FILTER AND FILTER DEVICE

CROSS REFERENCE TO RELATED APPLICATIONS

The present application is a continuation of International application No. PCT/JP2020/047500, filed Dec. 18, 2020, which claims priority to Japanese Patent Application No. 2020-046135, filed Mar. 17, 2020, the entire contents of each of which are incorporated herein by reference.

FIELD OF THE INVENTION

The present invention relates to a filter and a filter device.

BACKGROUND OF THE INVENTION

For example, Patent Document 1 discloses a filtration filter for sampling a cell aggregate. In the filtration filter of Patent Document 1, multiple first through-holes are periodically formed, and at least one of the multiple first through-holes is divided by multiple second through-holes. The second through-hole is smaller than the first through-hole.

Patent Document 1: International Publication No. 2018/042944

SUMMARY OF THE INVENTION

However, the filter described in Patent Document 1 still has room for improvement in terms of increasing durability.

An object of the present invention is to provide a filter and a filter device capable of increasing durability.

A filter of one aspect of the present invention is a filter that includes a filter base portion having a first main surface and a second main surface opposite to the first main surface, the filter base portion defining multiple first through-holes penetrating between the first main surface and the second main surface and one or multiple second through-holes penetrating between the first main surface and the second main surface, the one or multiple second through-holes being larger in size than the multiple first through-holes.

The filter base portion has a first region positioned on a center side of a filter, a second region positioned on an outer periphery side of the filter relative to the first region and positioned on the center side relative to an outer periphery of the filter, and a third region positioned between the second region and the outer periphery of the filter. The one or multiple second through-holes are provided in the second region, and in the first main surface, a ratio of an opening area of the one or multiple second through-holes is less than a ratio of an opening area of the multiple first through-holes.

A filter device of one aspect of the present invention includes one or multiple filters, and a holding portion that holds the one or multiple filters.

The one or multiple filters include a filter base portion having a first main surface and a second main surface opposite to the first main surface, the filter base portion defining multiple first through-holes penetrating between the first main surface and the second main surface and one or multiple second through-holes penetrating between the first main surface and the second main surface, the one or multiple second through-holes being larger in size than the multiple first through-holes. The filter base portion has a first region positioned on a center side of a filter, a second region positioned on an outer periphery side of the filter relative to the first region and positioned on the center side relative to an outer periphery of the filter, and a third region positioned between the second region and the outer periphery of the filter. The one or multiple second through-holes are provided in the second region. In the first main surface, a ratio of an opening area of the one or multiple second through-holes is less than a ratio of an opening area of the multiple first through-holes, and a flow path in which the one or multiple filters are disposed is formed inside the holding portion.

With the use of the present invention, it is possible to provide a filter and a filter device capable of increasing durability.

BRIEF DESCRIPTION OF THE DRAWINGS

FIG. 12 is a schematic view of a filter of a modification of Embodiment 1 according to the present invention.

DETAILED DESCRIPTION OF THE PREFERRED EMBODIMENTS

Background of the Present Invention

Figures 1, 2:
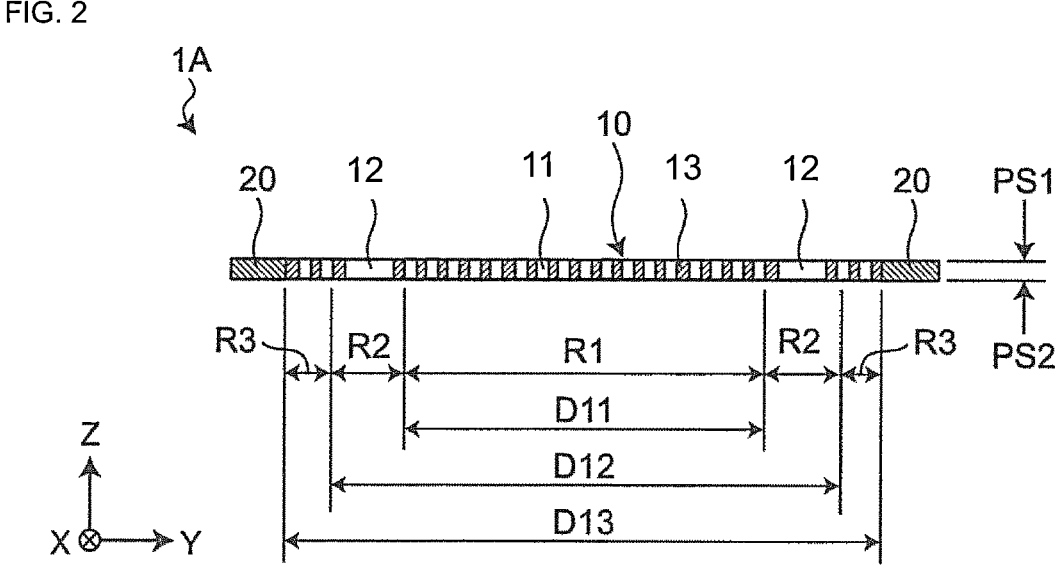
FIG. 1 is a schematic view of an example of a filter of Embodiment 1 according to the present invention.
FIG. 2 is a schematic sectional view of the filter in FIG. 1 taken along line A-A.

In the filter described in Patent Document 1, multiple first through-holes are periodically formed, and at least one of the multiple first through-holes is divided by multiple second through-holes smaller than the first through-hole. With this, a cell aggregate of a desired size is sampled.

However, in the filter described in Patent Document 1, clogging occurs during filtration due to accumulation of a filtration object on a filter portion provided with multiple through-holes. When clogging occurs during filtration, a liquid flows toward the through-holes that are not clogged. As a result, there is a problem that a portion where pressure locally increases turns up in the filter portion, and the filter is damaged from the portion.

As a result of intensive studies, the inventors of the present invention have found that when filtration is continued in a state in which clogging has occurred in a filter, damage is more likely to occur on an outer peripheral portion side of the filter than on a center side of the filter. This is probably because the flow velocity on the center side of the filter is higher than the flow velocity on the outer peripheral portion side of the filter. With this, a phenomenon occurs in which a filtration object is likely to be captured on the center side of the filter and a filtration object is not likely to be captured in the region on the outer periphery side of the filter. When clogging occurs on the center side of the filter, the liquid containing a filtration object flows toward the outer peripheral portion side of the filter. With this, the pressure applied to the outer peripheral portion side of the filter increases, and the filter is damaged on the outer peripheral portion side.

Accordingly, the inventors of the present invention have found a configuration in which one or multiple second through-holes, which are larger than multiple first through-holes formed in a filter portion, are provided on an outer peripheral portion side of a filter in order to lower the pressure applied to the outer peripheral portion side of the filter. Thus, the present invention has been conceived.

A filter of one aspect of the present invention is a filter that includes a filter base portion having a first main surface and a second main surface opposite to the first main surface, the filter base portion defining multiple first through-holes penetrating between the first main surface and the second main surface and one or multiple second through-holes penetrating between the first main surface and the second main surface, the one or multiple second through-holes being larger in size than the multiple first through-holes.

The filter base portion having a first region positioned on a center side of a filter, a second region positioned on an outer periphery side of the filter relative to the first region and positioned on the center side relative to an outer periphery of the filter, and a third region positioned between the second region and the outer periphery of the filter, the one or multiple second through-holes are provided in the second region, and in the first main surface, a ratio of an opening area of the one or multiple second through-holes is less than a ratio of an opening area of the multiple first through-holes.

With the configuration above, durability may be increased.

In the first main surface, the ratio of the opening area of the one or multiple second through-holes may be $6 \times 10^{-6}$ times to 0.2 times the ratio of the opening area of the multiple first through-holes.

With the configuration above, the durability may further be increased.

In the first main surface of the filter, a ratio of an area of the first region may be greater than a ratio of an area of the second region, and the ratio of the area of the first region may be greater than a ratio of an area of the third region.

With the configuration above, the durability may further be increased.

The filter may have a circular shape having a center point, the first region may have a circular shape centered on the center point of the filter, the second region may have an annular shape centered on the center point of the filter, and an outer diameter of the second region may be 0.11 times to 0.84 times a diameter of the filter.

With the configuration above, the durability may further be increased.

The multiple second through-holes may be positioned so as to sandwich the multiple first through-holes.

With the configuration above, it is possible to further increase the durability while suppressing a decrease in a collection rate.

The multiple second through-holes may be symmetrically arranged relative to the first region.

With the configuration above, it is possible to further increase the durability while suppressing a decrease in a collection rate.

The filter may further include a support portion on the second main surface and supporting the filter base portion.

The support portion may include multiple first support portions extending in a first direction and disposed at intervals, and multiple second support portions extending in a second direction that intersects the first direction, disposed at intervals, and connected to the multiple first support portions such that multiple exposed portions exposed from the support portion may be formed in the filter base portion when viewed from a side of the second main surface of the filter, and the one or multiple second through-holes may be provided in the multiple exposed portions formed in the second region.

With the configuration above, the durability may further be increased.

The second direction may be orthogonal to the first direction.

With the configuration above, it is possible to further increase the durability while suppressing a decrease in a collection rate.

The support portion may include a reinforcement portion connected to the multiple first support portions and the multiple second support portions in the third region of the second main surface, and an opening ratio of the reinforcement portion may be less than an opening ratio of a portion formed by the multiple first support portions and the multiple second support portions disposed in the first region and the second region.

With the configuration above, the durability may further be increased.

An opening ratio of the third region may be less than an opening ratio of each of the first region and the second region.

With the configuration above, the durability may further be increased.

The filter may be a metal porous film.

With the configuration above, the durability may further be increased.

The filter may further include a frame portion provided on the outer periphery of the filter base portion.

With the configuration above, the durability may further be increased.

A filter device of one aspect of the present invention includes one or multiple filters, and a holding portion that holds the one or multiple filters.

The one or multiple filters each include a filter base portion having a first main surface and a second main surface opposite to the first main surface, the filter base portion defining multiple first through-holes penetrating between the first main surface and the second main surface and one or multiple second through-holes penetrating between the first main surface and the second main surface, the one or multiple second through-holes being larger in size than the multiple first through-holes. The filter base portion having a first region positioned on a center side of a filter, a second region positioned on an outer periphery side of the filter relative to the first region and positioned on the center side relative to an outer periphery of the filter, and a third region positioned between the second region and the outer periphery of the filter. The one or multiple second through-holes are provided in the second region, and in the first main surface, a ratio of an opening area of the one or multiple second through-holes is less than a ratio of an opening area of the multiple first through-holes, and a flow path in which the one or multiple filters are disposed is formed inside the holding portion.

With the configuration above, the durability may be increased.

In the filter device, the multiple filters may include a first filter, and a second filter disposed in series with the first filter at an interval, and the one or multiple second through-holes of the first filter do not necessarily overlap the one or multiple second through-holes of the second filter when viewed from a direction in which the first filter and the second filter are disposed in series.

With the configuration above, it is possible to further increase the durability while suppressing a decrease in a collection rate.

Hereinafter, Embodiment 1 according to the present invention will be described with reference to the accompanying drawings. In the drawings, elements are exaggerated to facilitate explanation.

Embodiment 1

[Filter]

FIG. 1 is a schematic view of an example of a filter 1A of Embodiment 1 according to the present invention. FIG. 2 is a schematic sectional view of the filter 1A in FIG. 1 taken along line A-A. X, Y, and Z directions in the drawings indicate a longitudinal direction, a transverse direction, and a thickness direction of the filter 1A, respectively.

As illustrated in FIG. 1 and FIG. 2, the filter 1A includes a filter portion 10 and a frame portion 20 disposed to surround an outer periphery of the filter portion 10.

In Embodiment 1, the filter 1A is a metal porous film. Specifically, the filter 1A contains at least either of a metal or a metal oxide as a main component.

In Embodiment 1, an outer shape of the filter 1A is formed as a circle when viewed from the Z direction, for example. Note that the outer shape of the filter 1A is not limited to a circle and may be a square, a rectangle, a polygon, an ellipse, or the like.

<Filter Portion>

In the filter portion 10, the filter 1A has a first main surface PS1 and a second main surface PS2 opposite to the first main surface PS1. Specifically, the filter portion 10 has a plate-shaped structure with the first main surface PS1 and the second main surface PS2 opposed to the first main surface PS1. A filtration object contained in a liquid is captured on the first main surface PS1.

In the present description, the "filtration object" means an object to be filtered among objects contained in a liquid. For example, a filtration object includes objects originated in organisms such as cells, bacteria, and viruses. Examples of the cells include eggs, sperms, induced pluripotent stem cells (iPS cells), ES cells, stem cells, mesenchymal stem cells, mononuclear cells, single cells, cell aggregates, floating cells, adhesive cells, nerve cells, white blood cells, lymphocytes, cells for regenerative medicine, autologous cells, cancer cells, circulating tumor cells (CTCs), HL-60, HELA, and yeast. Examples of the bacteria include gram-positive bacteria, gram-negative bacteria, *Escherichia coli, Staphylococcus aureus*, and *Mycobacterium tuberculosis*. Examples of the viruses include DNA viruses, RNA viruses, rotaviruses, (bird) influenza viruses, yellow fever viruses, dengue viruses, encephalitis viruses, hemorrhagic fever viruses, and immunodeficiency viruses. The filtration object may include inorganic substances such as ceramic particles, binder particles, or aerosols; organic substances; or metals. The "liquid" includes electrolyte solutions, cell suspensions, cell culture media, and the like, for example.

The filter portion 10 includes a filter base portion 13 provided with multiple first through-holes 11 and multiple second through-holes 12.

Figure 3:
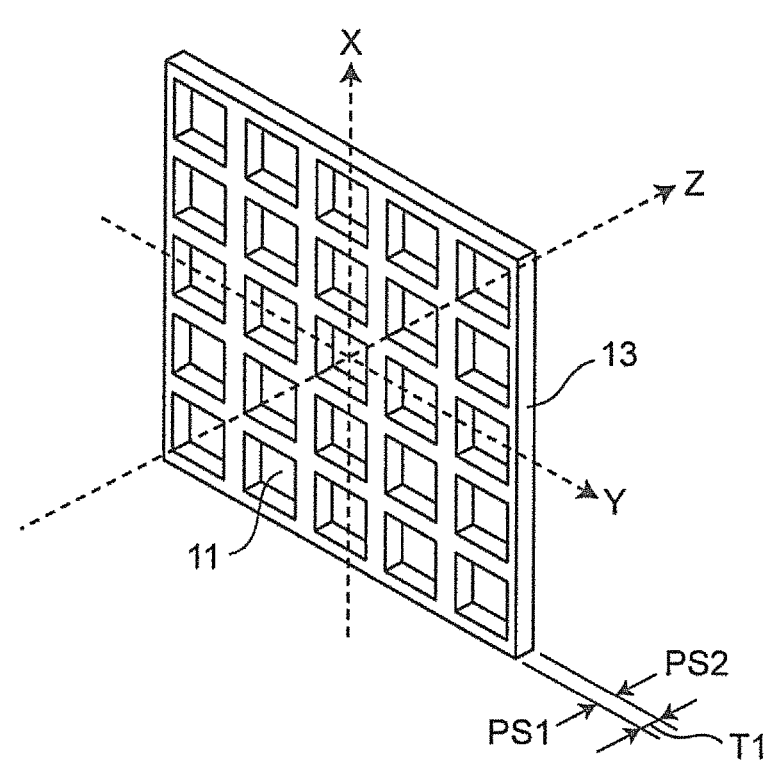
FIG. 3 is a schematic perspective view of a portion in which multiple first through-holes are provided in a filter portion.
Figure 4:
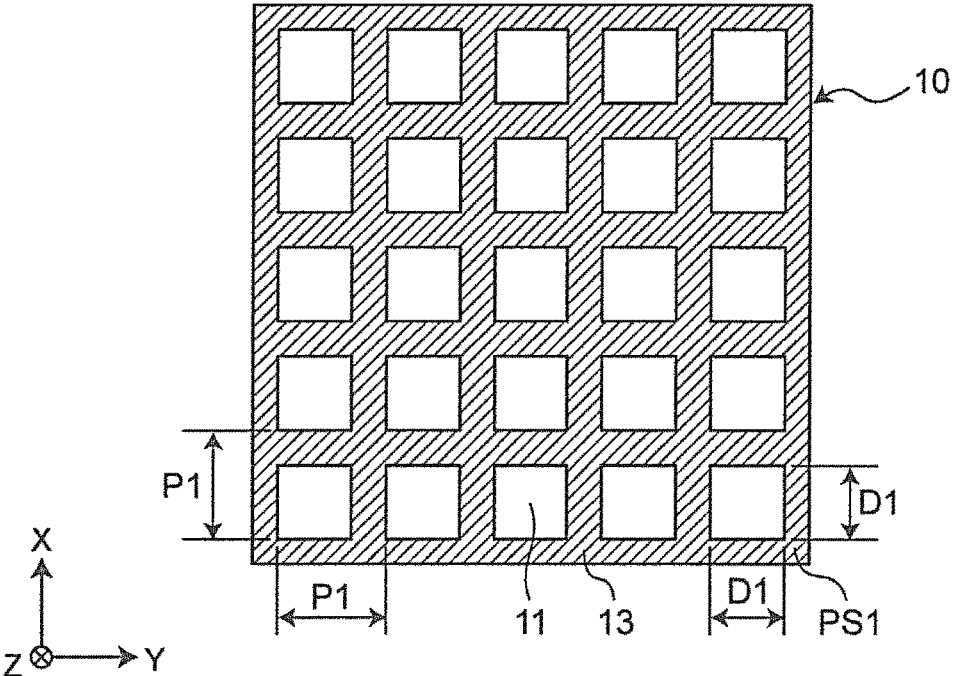
FIG. 4 is a schematic view of the filter portion in FIG. 3 viewed from a thickness direction.

FIG. 3 is a schematic perspective view of a portion in which the multiple first through-holes 11 are provided in the filter portion 10. FIG. 4 is a schematic view of the filter portion 10 in FIG. 3 viewed from the thickness direction. As illustrated in FIG. 3 and FIG. 4, the multiple first through-holes 11 penetrate between the first main surface PS1 and the second main surface PS2. The multiple first through-holes 11 are periodically formed. Specifically, the multiple first through-holes 11 are formed at equal intervals in a matrix shape.

In Embodiment 1, as illustrated in FIG. 4, the first through-hole 11 has a square shape of side D1 when viewed from the side of the first main surface PS1 of the filter portion 10, that is, from the Z direction. The side D1 of the first through-hole 11 is appropriately designed in accordance with a size, form, property, elasticity, or amount of a filtration object. A hole pitch P1 of the first through-holes 11 is also appropriately designed in accordance with the size, form, property, elasticity, or amount of a filtration object. Here, the hole pitch P1 of the square first through-holes 11 means a distance between one side of any first through-hole 11 and one side of an adjacent first through-hole 11 when viewed from the side of the first main surface PS1 of the filter portion 10.

The side D1 of the first through-hole 11 is 4.5 μm, for example. The hole pitch P1 of the first through-holes 11 is 6.5 μm. A thickness T1 of the filter portion 10 is 1.0 μm.

The thickness T of the filter portion 10 is preferably greater than 0.01 times and 10 times or less the size (side D1) of the first through-hole 11. More preferably, the thickness T of the filter portion 10 is greater than 0.05 times and 7 times or less the size (side D1) of the first through-hole 11. With the configuration above, it is possible to lower the passage resistance of a liquid to the filter portion 10 and to shorten the processing time.

As illustrated in FIG. 3 and FIG. 4, in the first through-hole 11, an opening on the side of the first main surface PS1 and an opening on the side of the second main surface PS2 communicate with each other through a continuous wall surface. Specifically, the first through-hole 11 is formed such that the opening on the side of the first main surface PS1 may be projected onto the opening on the side of the second main surface PS2. That is, when the filter portion 10 is viewed from the side of the first main surface PS1, the first through-hole 11 is provided such that the opening on the side of the first main surface PS1 overlaps the opening on the side of the second main surface PS2. In Embodiment 1, the first through-hole 11 is provided such that the inner walls thereof are substantially perpendicular to the first main surface PS1 and the second main surface PS2.

In Embodiment 1, the shape (sectional shape) of the first through-hole 11, projected onto a plane perpendicular to the first main surface PS1 of the filter portion 10, is a rectangle. The sectional shape of the first through-hole 11 is not limited to a rectangle and may be a parallelogram, a trapezoid, or the like, for example.

In Embodiment 1, the multiple first through-holes 11 are formed, when viewed from the side of the first main surface PS1 (Z direction) of the filter portion 10, at equal intervals in two array directions parallel to each side of a square, that is, in the X direction and the Y direction in FIG. 4. Thus, by providing the multiple first through-holes 11 in a square grid array, it is possible to increase the opening ratio and to lower the passage resistance (pressure loss) of a liquid to the filter portion 10.

Note that the array of the multiple first through-holes 11 is not limited to a square grid array and may be a quasi-periodic array or a periodic array, for example. Examples of the periodic array may include a rectangular array in which intervals in two array directions are not equal to each other as long as being a quadrangular array, a triangular grid array, a regular triangular grid array, or the like.

Figure 5:
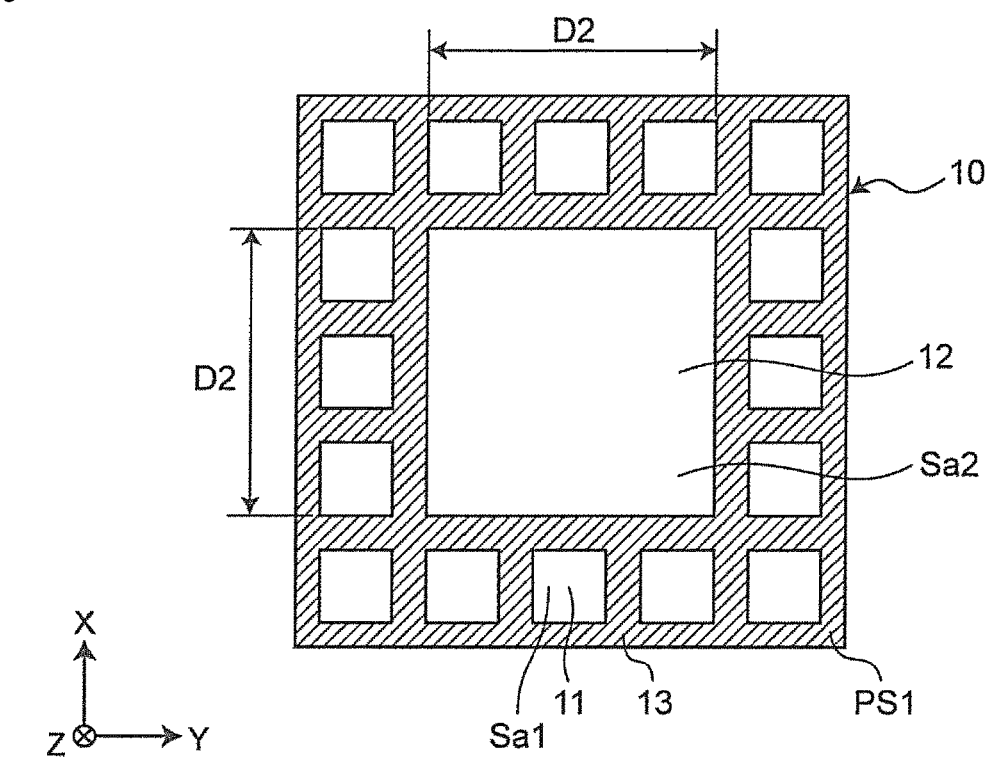
FIG. 5 is a schematic view of a portion in which a second through-hole is provided in the filter portion.

FIG. 5 is a schematic perspective view of a portion in which the second through-hole 12 is provided in the filter portion 10. As illustrated in FIG. 5, the multiple second through-holes 12 penetrate between the first main surface PS1 and the second main surface PS2. Further, the multiple second through-holes 12 are larger in size than the multiple first through-holes 11. In Embodiment 1, the shape of the second through-hole 12 is the same as the shape of the first through-hole 11 except for the size.

The second through-hole 12 has a square shape of side D2 when viewed from the side of the first main surface PS1 of the filter portion 10, that is, from the Z direction. The side D2 of the second through-hole 12 is larger than the thickness T of the filter portion 10. Further, the side D2 of the second through-hole 12 is larger than the side D1 of the first through-hole 11. For example, the side D2 of the second through-hole 12 is two times to 37 times the side D1 of the first through-hole 11. Preferably, the side D2 of the second through-hole 12 is four times to 26 times the side D1 of the first through-hole 11.

For example, the side D2 of the second through-hole 12 is 17.5 μm.

When the filter portion 10 is viewed from the thickness direction (Z direction) of the filter 1A, an opening area Sa2 of one second through-hole 12 is larger than an opening area Sa1 of one first through-hole 11.

In the first main surface PS1, a ratio of the opening areas Sa2 of the multiple second through-holes 12 is less than a ratio of the opening areas Sa1 of the multiple first through-holes 11. Here, the ratio of the opening areas Sa2 of the multiple second through-holes 12 means the ratio of the opening areas Sa2 of the multiple second through-holes 12 to an area of the filter portion 10 when viewed from the side of the first main surface PS1. The ratio of the opening areas Sa1 of the multiple first through-holes 11 means the ratio of the opening areas Sa1 of the multiple first through-holes 11 to the area of the filter portion 10 when viewed from the side of the first main surface PS1.

For example, in the first main surface PS1, the ratio of the opening areas Sa2 of the multiple second through-holes 12 is $6\times10^{-6}$ times to 0.2 times the ratio of the opening areas Sa1 of the multiple first through-holes 11. Preferably, in the first main surface PS1, the ratio of the opening areas Sa2 of the multiple second through-holes 12 is $2\times10^{-5}$ times to 0.1 times the ratio of the opening areas Sa1 of the multiple first through-holes 11.

When the filter portion 10 is viewed from the side of the first main surface PS1, the multiple second through-holes 12 are provided closer to the outer periphery side of the filter portion 10 than to the center side of the filter portion 10.

In particular, as illustrated in FIG. 1 and FIG. 2, the filter portion 10 includes a first region R1, a second region R2, and a third region R3. The first region R1 is positioned on a center side of the filter 1A. The second region R2 is positioned on an outer periphery side of the filter 1A relative to the first region R1 and is positioned on a center side relative to an outer periphery of the filter 1A. The third region R3 is positioned between the second region R2 and the outer periphery of the filter 1A.

In the first main surface PS1 of the filter portion 10, a ratio of an area of the first region R1 is greater than a ratio of an area of the second region R2. Further, in the first main surface PS1 of the filter portion 10, the ratio of the area of the first region R1 is greater than a ratio of an area of the third region R3. Here, the ratio of the area of the first region R1 means the ratio of an area of the first region R1 to the area of the filter portion 10 when viewed from the side of the first main surface PS1. The ratio of the area of the second region R2 means the ratio of the area of the second region R2 to the area of the filter portion 10 when viewed from the side of the first main surface PS1. The ratio of the area of the third region R3 means the ratio of the area of the third region R3 to the area of the filter portion 10 when viewed from the side of the first main surface PS1.

For example, in the first main surface PS1 of the filter portion 10, the ratio between the first region R1, the second region R2, and the third region R3 is 1:3:5 to 1:0.21:0.23. Preferably, in the first main surface PS1 of the filter portion 10, the ratio between the first region R1, the second region R2, and the third region R3 is 1:1.25:1.75 to 1:0.21:0.23.

In Embodiment 1, the filter portion 10 has a circular shape. The first region R1 has a circular shape. An outer periphery of the first region with a circular shape is surrounded by the second region R2. The second region R2 is surrounded by the first region R1 and the third region R3. The third region R3 is in contact with an outer periphery of the second region that is not in contact with the first region R1.

The filter 1A has a circular shape with a center point. The first region R1 of the filter portion 10 has a circular shape centered on the center point of the filter 1A. The second region R2 has an annular shape centered on the center point of the filter 1A. An outer diameter of the second region R2 is 0.11 times to 0.84 times a diameter of the filter 1A.

The filter portion 10 is a circular region having a diameter D13 from the center of the filter. In the filter portion 10, a virtual circle C1 having a diameter D11 smaller than the diameter D13 and a virtual circle C2 having a diameter D12 smaller than the diameter D13 and larger than the diameter D11 are drawn with the center of the filter as a reference. For example, the diameter D11 is 0.67 times the diameter D13, and the diameter D12 is 0.83 times the diameter D13.

In Embodiment 1, in the filter portion 10, the first region R1 is a circular region surrounded by the virtual circle C1. The second region R2 is an annular region sandwiched between the virtual circle C1 and the virtual circle C2. The third region R3 is an annular region sandwiched between the virtual circle C2 and the outer periphery of the filter portion 10.

Note that the first region R1 is not limited to a circle. The second region R2 and the third region R3 are not limited to having an annular shape. The first region R1, the second region R2, and the third region R3 may be changed in accordance with an outer shape of the filter portion 10. For example, when the outer shape of the filter portion 10 is a rectangle, the first region R1 may be a rectangle or may have an elliptical shape, and the second region R2 and the third region R3 may have a rectangular frame shape or an elliptical frame shape.

The multiple second through-holes 12 are provided in the second region R2. In Embodiment 1, the multiple first through-holes 11 are provided in the first region R1, the second region R2 and the third region R3.

The multiple second through-holes 12 are positioned sandwiching the multiple first through-holes 11. The multiple second through-holes 12 are dispersed. For example, the multiple second through-holes 12 are provided at predetermined intervals.

The multiple second through-holes 12 are uniformly distributed in the second region R2. The multiple second through-holes 12 are symmetrically arranged relative to the first region R1. Specifically, the multiple second through-holes 12 are symmetrically provided with a center point of the circular first region R1 as a reference.

In Embodiment 1, four second through-holes 12 are symmetrically arranged in the second region R2 of the filter portion 10 relative to the first region R1. Specifically, the four second through-holes 12 are concentrically provided. Further, the four second through-holes 12 are provided being shifted by 90 degrees with the center of the filter portion 10 as a reference.

An opening ratio of the third region R3 is less than an opening ratio of each of the first region R1 and the second region R2. Note that the opening ratio is calculated by (area of through-holes)/(projected area of the region assuming that through-holes are not formed), when the filter portion 10 is viewed from the side of the first main surface PS1.

The filter base portion 13 contains a metal and/or a metal oxide as a main component. The material constituting the filter base portion 13 may be gold, silver, copper, platinum, nickel, palladium, an alloy thereof, or an oxide thereof, for example.

<Frame Portion>

The frame portion 20 is a member disposed to surround the outer periphery of the filter portion 10. The frame portion 20 is annularly formed when viewed from the side of the first main surface PS1 of the filter portion 10. Further, when the filter 1A is viewed from the side of the first main surface PS1, a center of the frame portion 20 coincides with the center of the filter portion 10. That is, the frame portion 20 is formed concentrically with the filter portion 10.

In Embodiment 1, a thickness of the frame portion 20 is equal to a thickness T1 of the filter portion 10. The thickness of the frame portion 20 may be larger than the thickness T1 of the filter portion 10. With the configuration above, it is possible to increase the mechanical strength of the filter 1A.

The frame portion 20 is held by a holding portion 30 described later.

On the frame portion 20, information on the filter 1A such as the sizes of the first through-hole 11 and the second through-hole 12, for example, may be displayed. This makes it easy to grasp the filter hole size without measuring or to distinguish the front and back sides.

[Filter Device]

Figure 6:
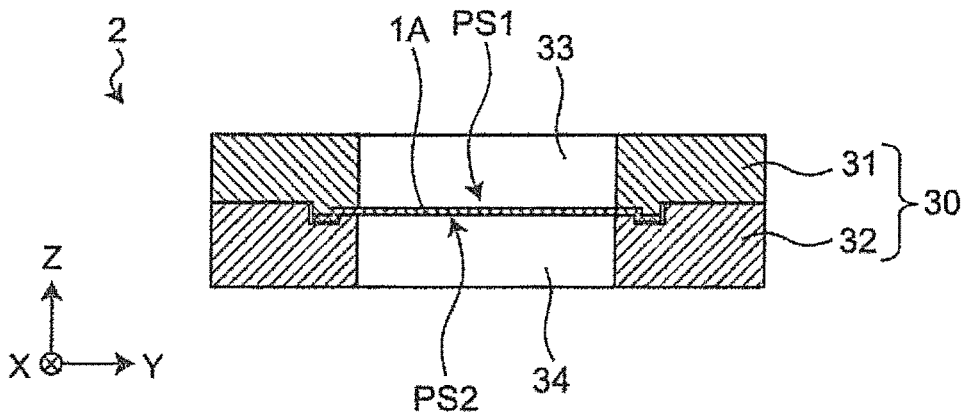
FIG. 6 is a schematic view of an example of a filter device of Embodiment 1 according to the present invention.

FIG. 6 is a schematic view of an example of a filter device 2 of Embodiment 1 according to the present invention. As illustrated in FIG. 6, the filter device 2 includes the filter 1A and the holding portion 30 that holds the filter 1A.

<Holding Portion>

The holding portion 30 holds the filter 1A. Inside the holding portion 30, a flow path is formed in which the filter 1A is disposed. For example, the holding portion 30 includes a first flow path member 31 and a second flow path member 32. The first flow path member 31 and the second flow path member 32 of the holding portion 30 sandwich and hold the frame portion 20 of the filter 1A.

The first flow path member 31 has a first flow path 33 connected to the first main surface PS1 of the filter 1A. The first flow path member 31 is disposed on the side of the first main surface PS1 of the filter 1A.

The first flow path member 31 is cylindrically formed. A hollow portion is formed inside the first flow path member 31. For example, the hollow portion is a through-hole. The first flow path 33 is formed with the hollow portion of the first flow path member 31. In Embodiment 1, the first flow path member 31 has a cylindrical shape.

The first flow path 33 is connected to the first main surface PS1 of the filter 1A. The first flow path 33 faces the first main surface PS1 of the filter 1A. In other words, an extending direction of the first flow path 33 intersects the first main surface PS1 of the filter 1A. In FIG. 6, the first flow path 33 extends in the Z direction, and the first main surface PS1 of the filter 1A extends in the X direction and the Y direction. In Embodiment 1, the extending direction of the first flow path 33 is orthogonal to the first main surface PS1 of the filter 1A.

To the first flow path member 31, a tubular member such as a tube is connected, for example. Note that a member connected to the first flow path member 31 is not limited to a tubular member. For example, a tubular member may be a connector.

The second flow path member 32 has a second flow path 34 connected to the second main surface PS2 of the filter 1A. The second flow path member 32 is disposed on the side of the second main surface PS2 of the filter 1A.

The second flow path member 32 is cylindrically formed. A hollow portion is formed inside the second flow path member 32. For example, the hollow portion is a through-hole. The second flow path 34 is formed with the hollow portion of the second flow path member 32. In Embodiment 1, the second flow path member 32 has a cylindrical shape.

The second flow path 34 is connected to the second main surface PS2 of the filter 1A. The second flow path 34 faces the second main surface PS2 of the filter 1A. In other words, an extending direction of the second flow path 34 intersects the second main surface PS2 of the filter 1A. In FIG. 6, the second flow path 34 extends in the Z direction, and the second main surface PS2 of the filter 1A extends in the X direction and the Y direction. In Embodiment 1, the extending direction of the second flow path 34 is orthogonal to the second main surface PS2 of the filter 1A.

For example, a tubular member such as a tube is connected to the second flow path member 32. Note that a member connected to the second flow path member 32 is not limited to a tubular member. For example, a tubular member may be a connector.

The first flow path member 31 and the second flow path member 32 sandwich and hold the frame portion 20 of the filter 1A. The frame portion 20 of the filter 1A is sandwiched and held between the first flow path member 31 and the second flow path member 32 in a bent state. For example, the first flow path member 31 is provided with a projecting portion, and the second flow path member 32 is provided with a recessed portion. The projecting portion and the recessed portion fit with each other in a state of sandwiching the frame portion 20 of the filter 1A, and thus the frame portion 20 of the filter 1A is held in a bent state. With this, the filter portion 10 of the filter 1A is disposed in the first flow path 33 and the second flow path 34.

Figure 7:
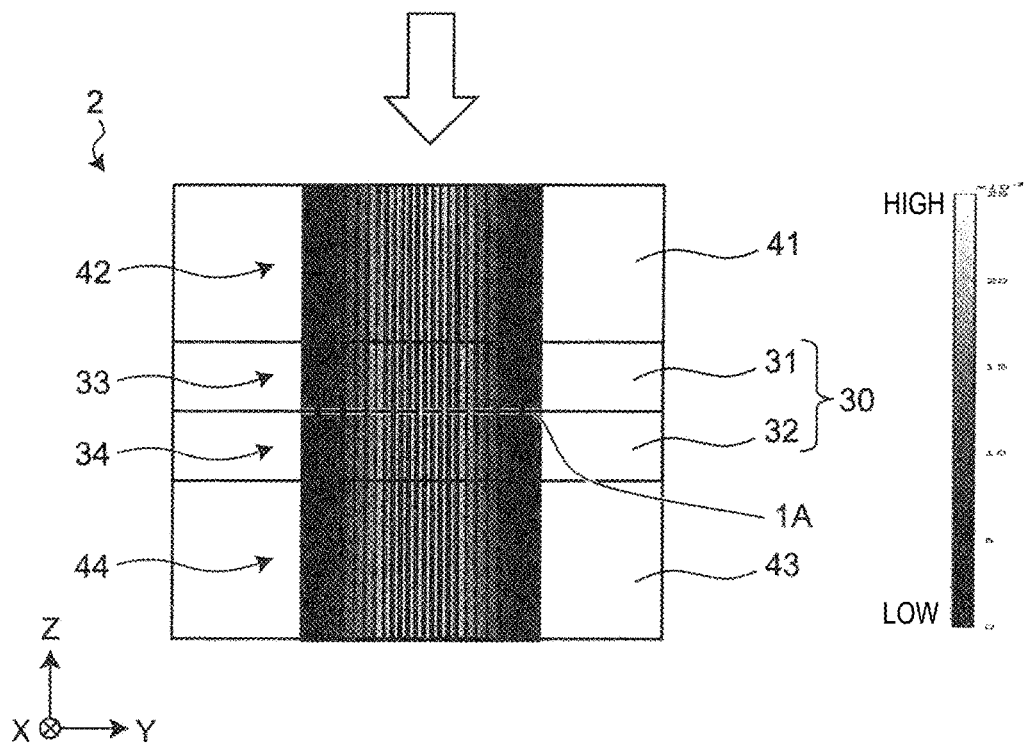
FIG. 7 is a diagram illustrating an example of a calculation result of a flow velocity distribution and a streamline of a liquid flowing in the filter device.
Figure 8:
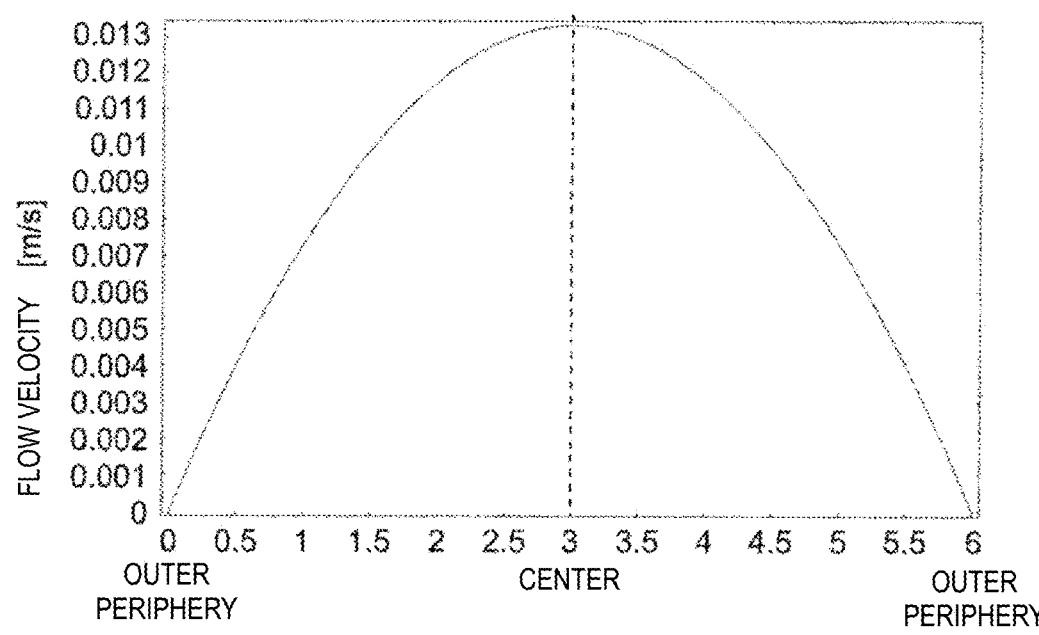
FIG. 8 is a graph illustrating an example of a flow velocity of a liquid passing through the filter.

FIG. 7 is a diagram illustrating an example of a calculation result of a flow velocity distribution and a streamline of a liquid flowing in the filter device 2. FIG. 8 is a graph illustrating an example of a flow velocity of a liquid passing through the filter 1A. In FIG. 7, a first tube 41 is connected to the first flow path member 31. A first tube flow path 42 is formed inside the first tube 41. A second tube 43 is connected to the second flow path member 32. A second tube flow path 44 is formed inside the second tube 43. The first flow path 33, the second flow path 34, the first tube flow path 42, and the second tube flow path 44 have the same sectional shape. Further, the first flow path 33, the second flow path 34, the first tube flow path 42, and the second tube flow path 44 have the same flow path sectional area. Note that calculation in FIG. 7 was performed using finite element method software "COSMOL" (coded by KEISOKU ENGINEERING SYSTEM CO., LTD.). The calculation was performed by creating a two-dimensional model using actual sizes. Calculation conditions were as follows: the liquid was pure water (density in 300K: $0.99765 \times 10^3$ [kg/m$^3$], viscosity coefficient: $8.5403 \times 10^{-4}$ [Pa·s]); the inflow velocity of the liquid from an inflow port was 0.01326 [m/s]; and air pressure at a discharge port was atmospheric pressure.

As illustrated in FIG. 7, in the filter device 2, the flow velocity of the liquid flowing through the first flow path 33, the second flow path 34, the first tube flow path 42, and the second tube flow path 44 is higher in a center portion than in a wall surface portion. As a result, as illustrated in FIG. 8, the flow velocity of the liquid passing through the region on the center side of the filter 1A is higher than the flow velocity of the liquid passing through the region on the outer periphery side of the filter 1A. That is, the flow velocity of the liquid passing through the first region R1 of the filter portion 10 is higher than the flow velocity of the liquid flowing through the second region R2 and the third region R3 of the filter portion 10. As a result, in the filter portion 10, the liquid flows through easier in the first region R1 than in the second region R2 and the third region R3. This makes it likely that a filtration object is captured in the first region R1 than in the second region R2 and the third region R3 of the filter portion 10 when the filter 1A is not clogged. As a result, in the filter portion 10, clogging is likely to occur in the order of the first region R1, the second region R2, and the third region R3 of the filter portion 10.

Figure 9:
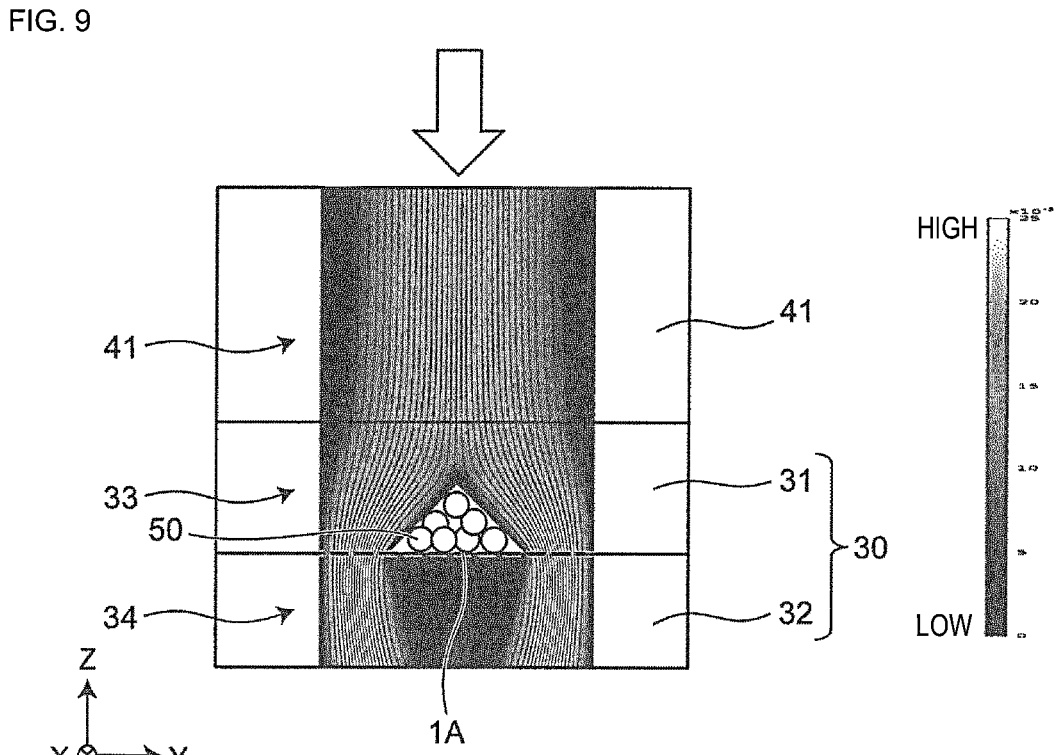
FIG. 9 is a diagram illustrating an example of a calculation result of a flow velocity distribution and a streamline of the filter device that has captured a filtration object.

FIG. 9 is a diagram illustrating an example of a calculation result of a flow velocity distribution and a streamline of the filter device 2 that has captured a filtration object 50. Note that the calculation in FIG. 9 was performed using the finite element method software and calculation conditions used in the calculation in FIG. 7. In FIG. 9, a filtration object 50 is captured in the first region R1 of the filter 1A, and clogging occurs. As illustrated in FIG. 9, the flow velocity of the liquid flowing through the first flow path 33 and the second flow path 34 is higher in an outer periphery side region than in a center side region of the filter 1A. That is, when clogging occurs in the first region R1 of the filter portion 10, the flow velocity of the liquid flowing through the second region R2 and the third region R3 of the filter portion 10 is higher than the flow velocity of the liquid passing through the first region R1. Further, the flow velocity of the liquid flowing through the second region R2 and the third region R3 when clogging occurs in the first region R1 of the filter portion 10 is higher than the flow velocity of the liquid flowing through the first region R1 when clogging does not occur. As a result, the second region R2 and the third region R3 of the filter portion 10 are likely to be locally pressurized.

Figure 10:
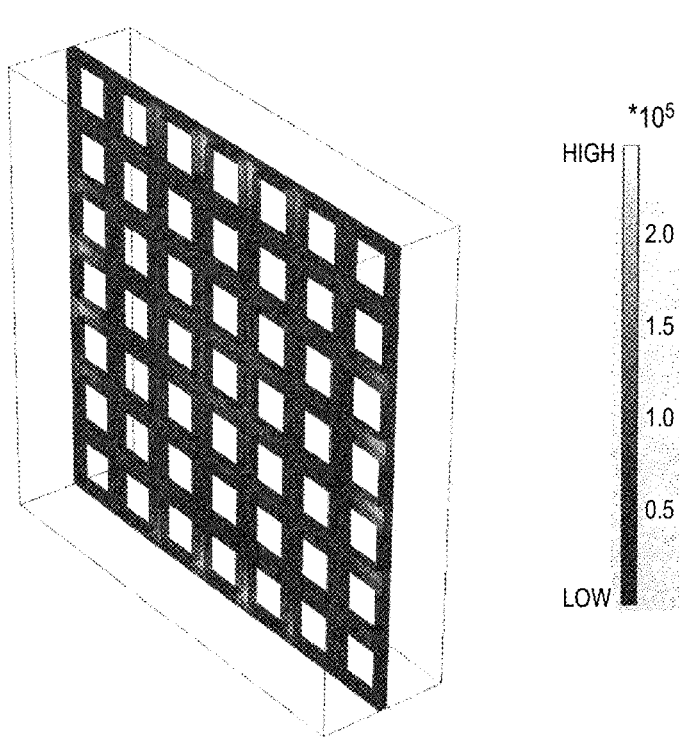
FIG. 10 is a diagram illustrating an example of a calculation result of stress received from a liquid in the filter.

FIG. 10 is a diagram illustrating an example of a calculation result of stress received from a liquid in a filter. For the filter used in the calculation in FIG. 10, a calculation model was used in which 7×7 first through-holes 11 were periodically provided. Four side surfaces of an outer periphery of the calculation model were fixed ends, and a state in which the filter was fixed by the holding portion 30 was reproduced. In the calculation in FIG. 10, the von Mises stress in the filter was calculated when a liquid passed through the filter. Note that the calculation in FIG. 10 was performed using the finite element method software and the calculation conditions used in the calculation in FIG. 7. Further, the calculation was performed with a boundary condition of the outer periphery of the filter as a fixed end. As illustrated in FIG. 10, von Mises stress is greater in the outer periphery side region than in the center side region of the filter.

Figure 11A:
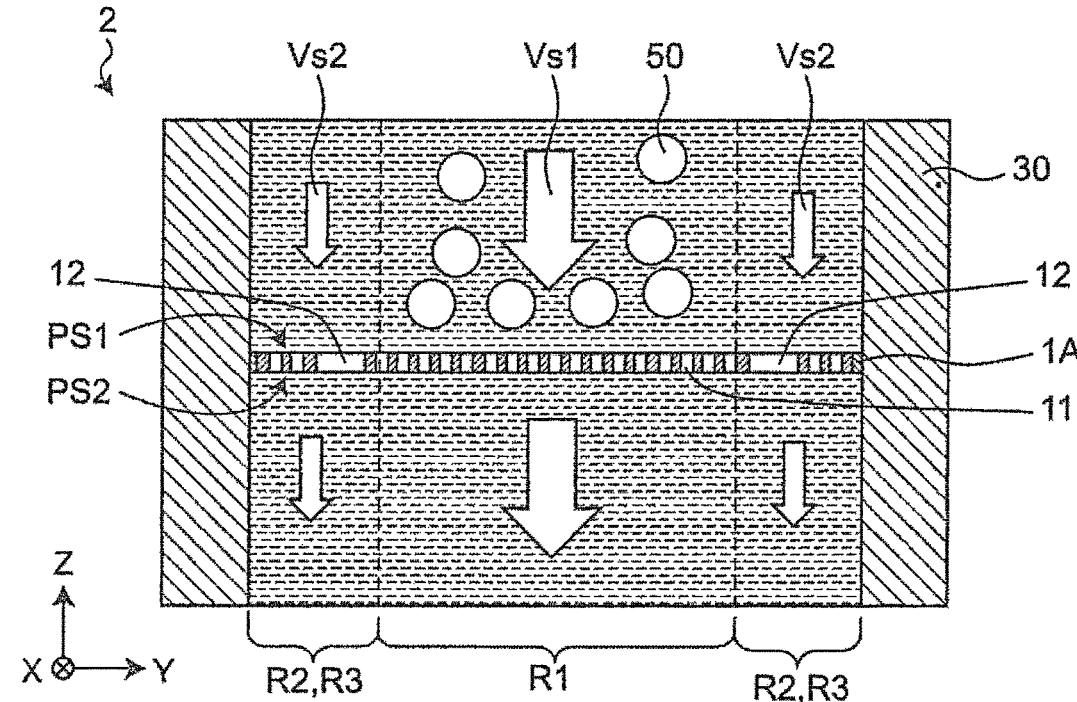
FIG. 11A is a schematic diagram for explaining an example of filtration using the filter device.
Figure 11B:
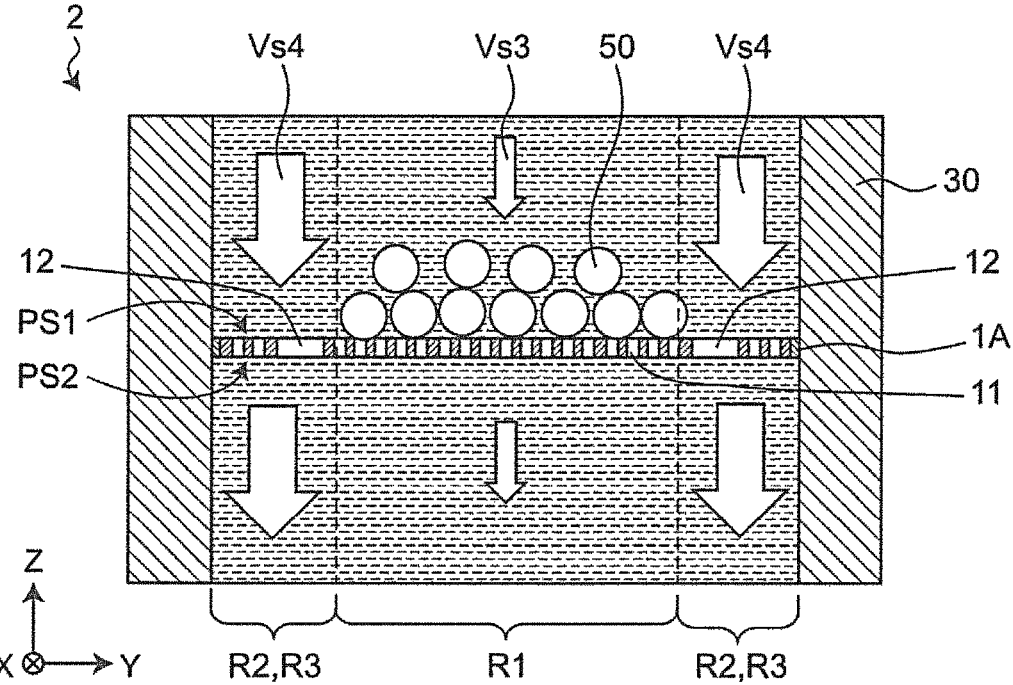
FIG. 11B is a schematic diagram for explaining an example of filtration using the filter device.

FIG. 11A and FIG. 11B are schematic diagrams for explaining an example of filtration using the filter device 2. As illustrated in FIG. 11A, when there is no clogging in the filter 1A, a flow velocity Vs1 of a liquid passing through the first region R1 of the filter portion 10 is higher than a flow velocity Vs2 of a liquid flowing through the second region R2 and the third region R3 of the filter portion 10. As a result, the filtration object 50 is captured in the first region R1.

As illustrated in FIG. 11B, when capturing the filtration object 50 in the first region R1 of the filter portion 10 continues, clogging occurs in the first region R1. When clogging occurs in the first region R1, it becomes likely that a liquid flows to the second region R2 and the third region R3 of the filter portion 10. At this time, a flow velocity Vs4 of a liquid flowing through the second region R2 and the third region R3 of the filter portion 10 is higher than a flow velocity Vs3 of a liquid passing through the first region R1.

In the filter 1A, a second through-hole 12 larger than the first through-hole 11 is provided in the second region R2 of the filter portion 10. As a result, a liquid passing through the second region R2 passes through the second through-holes 12, and this makes it possible to lower the pressure applied to the outer periphery side region of the filter portion 10.

[Effects]

With the use of the filter 1A and the filter device 2 according to Embodiment 1, the following effects may be achieved.

The filter 1A has the first main surface PS1 and the second main surface PS2 opposite to the first main surface PS1. The filter 1A includes the filter base portion 13 provided with the multiple first through-holes 11 penetrating between the first main surface PS1 and the second main surface PS2, and the multiple second through-holes 12 penetrating between the first main surface PS1 and the second main surface PS2 and being larger in size than the multiple first through-holes 11. The filter base portion 13 includes the first region R1 positioned on the center side of the filter 1A; the second region R2 positioned on the outer periphery side of the filter 1A relative to the first region R1, and positioned on a center side relative to the outer periphery of the filter 1A; and the third region R3 positioned between the second region R2 and the outer periphery of the filter 1A. The multiple second through-holes 12 are provided in the second region R2. In the first main surface PS1, the ratio of the opening areas Sa2 of the multiple second through-holes 12 is less than the ratio of the opening areas Sa1 of the multiple first through-holes 11.

With the configuration above, durability of the filter 1A may be increased. For example, in a case that a liquid containing a filtration object is filtered by the filter 1A, the liquid flows easier to the first region R1 being the center side region than to the second region R2 and the third region R3 being the outer periphery side regions of the filter 1A. As a result, clogging is more likely to occur in the first region R1 than in the second region R2 and the third region R3. When clogging occurs in the first region R1, the pressure applied to the filter 1A in the second region R2 and the third region R3 gradually increases. With the use of the filter 1A, the pressure applied to the filter 1A may be lowered by the multiple second through-holes 12 provided in the second region R2. With this, when clogging occurs in the first region R1 of the filter 1A, damage to the filter 1A, due to an increase in pressure loss occurred in the second region R2, may be suppressed.

In the filter 1A, the multiple second through-holes 12 are provided in the second region R2 positioned on the outer periphery side of the filter 1A relative to the first region R1, and positioned on the center side relative to the outer periphery of the filter 1A. With the configuration above, it is possible to increase the durability of the filter 1A while suppressing a decrease in a collection rate of a filtration object.

In the first main surface PS1, the ratio of the opening areas Sa2 of the multiple second through-holes 12 is $6\times10^{-6}$ times to 0.2 times the ratio of the opening areas Sa1 of the multiple first through-holes 11. With the configuration above, it is possible to further increase the durability of the filter 1A while suppressing a decrease in a collection rate of a filtration object.

In the first main surface PS1 of the filter 1A, the ratio of the area of the first region R1 is greater than the ratio of the area of the second region R2. The ratio of the area of the first region R1 is greater than the ratio of the area of the third region R3. With the configuration above, it is possible to further increase the durability of the filter 1A while suppressing a decrease in a collection rate of a filtration object.

The multiple second through-holes 12 are dispersed. With the configuration above, the pressure applied to the second region R2 of the filter 1A is likely to be lowered, and the durability of the filter 1A may further be increased.

The multiple second through-holes 12 are symmetrically arranged relative to the first region R1. With the configuration above, the durability of the filter 1A may further be increased.

The filter 1A is a metal porous film. With the configuration above, the durability of the filter 1A may further be increased.

The filter 1A includes the filter portion 10 provided with the filter base portion 13, and the frame portion 20 provided on the outer periphery of the filter portion 10. With the configuration above, the durability of the filter 1A may further be increased.

The filter device 2 includes the filter 1A and the holding portion 30 that holds the filter 1A. Inside the holding portion 30, the flow paths 33 and 34 are formed in which multiple filters are disposed. With the configuration above, it is possible to increase durability of the filter device 2 while suppressing a decrease in a collection rate of a filtration object.

Note that, in Embodiment 1, an example has been described in which the filter 1A is a metal porous film, but the present invention is not limited thereto. The filter 1A may be made of a material other than a metal. For example, the filter 1A may be a membrane filter.

In Embodiment 1, an example has been described in which the four second through-holes 12 are provided in the filter 1A, but the present invention is not limited thereto. It is sufficient that the one or multiple second through-holes 12 are provided in the filter 1A.

In Embodiment 1, an example has been described in which the multiple second through-holes 12 are symmetrically arranged relative to the first region R1, but the present invention is not limited thereto. It is sufficient that the multiple second through-holes 12 is dispersedly provided. For example, the multiple second through-holes 12 may be provided at regular or irregular intervals.

In Embodiment 1, an example has been described in which the first through-hole 11 and the second through-hole 12 have a square shape when viewed from the Z direction, but the present invention is not limited thereto. For example, the first through-hole 11 and the second through-hole 12 may be a rectangle, a polygon, a circle, an ellipse, or the like when viewed from the Z direction.

Figure 12:
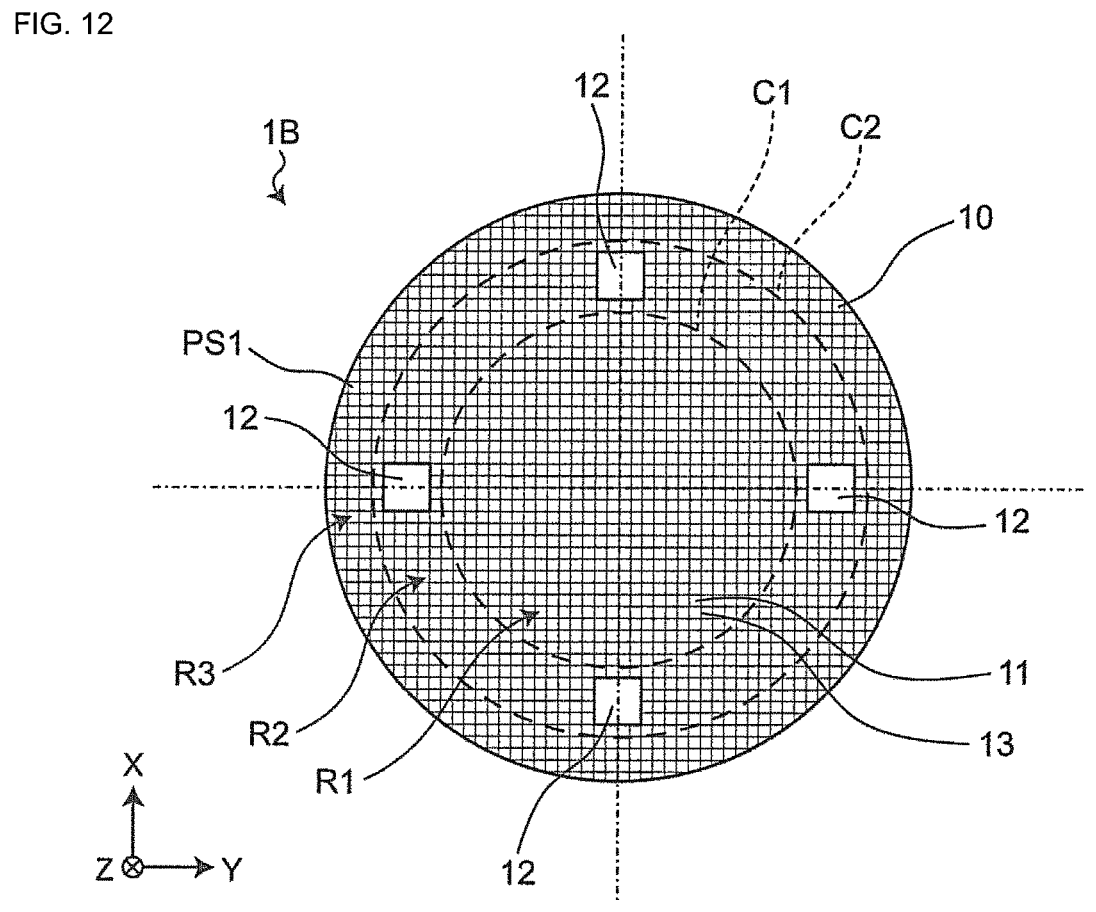

In Embodiment 1, an example has been described in which the filter 1A includes the frame portion 20, but the present invention is not limited thereto. It is acceptable that the filter 1A does not include the frame portion 20. FIG. 12 is a schematic view of a filter 1B of a modification of Embodiment 1 according to the present invention. As illustrated in FIG. 12, the filter 1B does not include the frame portion 20, and is formed with the filter portion 10. Even with the configuration above, it is possible to increase the durability of the filter device 2 while suppressing a decrease in a collection rate of a filtration object.

In Embodiment 1, an example has been described in which the filter device 2 includes the one filter 1A, but the present invention is not limited thereto. The filter device 2 may include one or multiple filters 1A.

Embodiment 2

A filter of Embodiment 2 according to the present invention will be described.

In Embodiment 2, differences from Embodiment 1 will be mainly described. In Embodiment 2, the same or equivalent components as those in Embodiment 1 will be denoted by the same reference signs. Further, in Embodiment 2, the description that overlaps that of Embodiment 1 will be omitted.

Embodiment 2 is different from Embodiment 1 in that a support portion is provided on the second main surface of the filter portion.

Figures 13, 14:
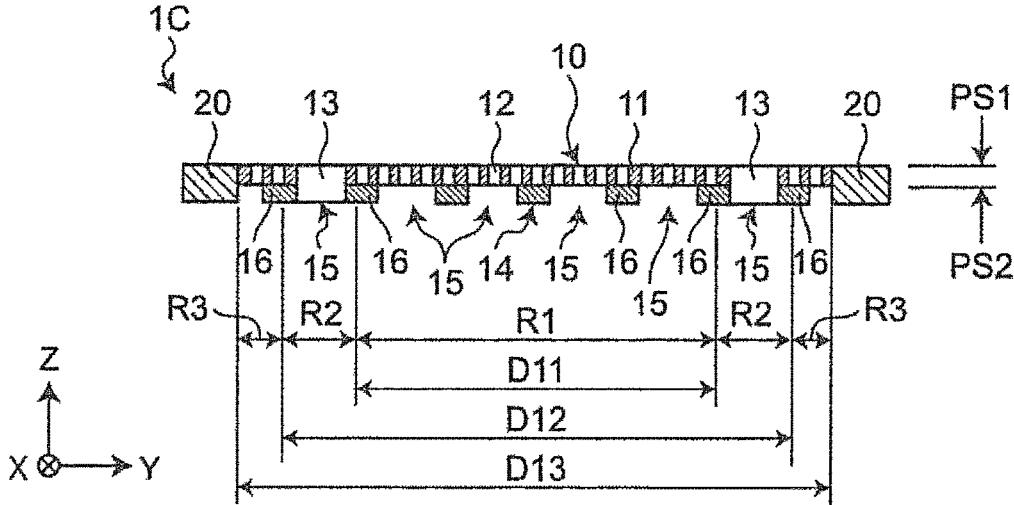
FIG. 13 is a schematic view of an example of a filter of Embodiment 2 according to the present invention.
FIG. 14 is a schematic sectional view of the filter in FIG. 13 taken along line B-B.

FIG. 13 is a schematic view of an example of a filter 1C of Embodiment 2 according to the present invention. FIG. 13 is a schematic view of the filter 1C viewed from the side of the second main surface PS2. FIG. 14 is a schematic sectional view of the filter 1C in FIG. 13 taken along line B-B. As illustrated in FIG. 13 and FIG. 14, the filter 1C includes a support portion 14 provided on the second main surface PS2 of the filter portion 10.

The support portion 14 has a plate-shaped structure. The support portion 14 includes multiple first support portions 16 and multiple second support portions 17.

The multiple first support portions 16 are multiple plate-shaped members extending in a first direction A1 and disposed at intervals. The multiple second support portions 17 are multiple plate-shaped members extending in a second direction A2 that intersects the first direction A1, disposed at intervals, and being connected to the multiple first support portions 16.

In Embodiment 2, the second direction A2 is orthogonal to the first direction A1. When viewed from the side of the second main surface PS2, the multiple first support portions 16 extend in the X direction, and the multiple second support portions 17 extend in the Y direction orthogonal to the X direction.

The first support portion 16 and the second support portion 17 are formed of the same material as the filter portion 10. For example, the first support portion 16 and the second support portion 17 contain a metal and/or a metal oxide as a main component. The material constituting the filter base portion 13 may be gold, silver, copper, platinum, nickel, palladium, an alloy thereof, or an oxide thereof, for example. Note that the first support portion 16 and the second support portion 17 may be formed of a material different from that of the filter portion 10.

When viewed from the side of the second main surface PS2 of the filter 1C, the support portion 14 exposes part of the filter base portion 13. That is, when viewed from the side of the second main surface PS2 of the filter 1C, multiple exposed portions 15 exposed from the support portion 14 are formed in the filter base portion 13. Specifically, when viewed from the side of the second main surface PS2 of the filter 1C, the exposed portions 15 that expose the filter base portion 13 are formed in each of multiple regions surrounded by the multiple first support portions 16 and the multiple second support portions 17.

In the multiple exposed portions 15 formed in the second region R2 of the filter portion 10, the multiple second through-holes 12 are provided. That is, when the filter portion 10 is viewed from the side of the second main surface PS2, the second through-hole 12 overlaps a region where the exposed portion 15 is formed.

A shape of the exposed portion 15 is delimited based on a disposition of the multiple first support portions 16 and the multiple second support portions 17. In Embodiment 2, the multiple first support portions 16 and the multiple second support portions 17 are orthogonal to each other and are disposed at equal intervals. As a result, the exposed portion 15 has a square shape when the filter portion 10 is viewed from the side of the second main surface PS2. The exposed portion 15 has a square shape of side D3 when viewed from the side of the second main surface PS2 of the filter portion 10, that is, from the Z direction. The side D3 of the exposed portion 15 is equal to the side D2 of the second through-hole 12.

In Embodiment 2, the multiple exposed portions 15 are formed at equal intervals in two array directions parallel to each side of the square when viewed from the side of the second main surface PS2 of the filter portion 10, that is, in the X direction and the Y direction in FIG. 13.

Note that the array of the multiple exposed portions 15 is not limited to a square grid array, and may be a quasi-periodic array or a periodic array, for example. An example of a periodic array may be a rectangular array in which intervals in two array directions are not equal to each other as long as being a quadrangular array, a triangular grid array, a regular triangular grid array, or the like.

For example, a thickness of the support portion 14 is 14 μm. The support portion 14 has a width W1 of 20 μm. The side D3 of the exposed portion 15 is 240 μm. A pitch P2 of the exposed portion 15 is 260 μm.

Effects

With the use of the filter 1C according to Embodiment 2, the following effects may be achieved.

The filter 1C includes the support portion 14 being provided on the second main surface PS2 and supporting the filter base portion 13. The support portion 14 includes the multiple first support portions 16 extending in the first direction A1 and disposed at intervals and the multiple second support portions 17 extending in the second direction A2 that intersects the first direction A1, disposed at intervals, and being connected to the multiple first support portions 16. When viewed from the side of the second main surface PS2 of the filter 1C, the multiple exposed portions 15 exposed from the support portion 14 are formed in the filter base portion 13. The multiple second through-holes 12 are provided in the multiple exposed portions 15 formed in the second region R2.

Thus, by providing the support portion 14 that supports the filter portion 10 on the side of the second main surface PS2 of the filter 1C, it is possible to further increase durability of the filter 1C.

Further, when viewed from the side of the second main surface PS2 of the filter 1C, the multiple second through-holes 12 are provided in the multiple exposed portions 15 in the second region R2. This makes it possible that the filter base portion 13 in the vicinity of the multiple second through-holes 12 is supported by the support portion 14. As a result, durability of the filter base portion 13 in the vicinity of the multiple second through-holes 12 may further be increased.

The second direction A2 is orthogonal to the first direction A1. With the configuration above, it is possible to increase an opening ratio of the support portion 14. With this, it is possible to further increase the durability of the filter 1C while suppressing a decrease in a collection rate of a filtration object.

Note that, in Embodiment 2, an example has been described in which the exposed portion 15 has a square shape when viewed from the Z direction, but the present invention is not limited thereto. For example, the exposed portion 15 may be a rectangle, a polygon, a circle, or an ellipse when viewed from the Z direction.

In Embodiment 2, an example has been described in which a size of the exposed portion 15 is equal to a size of the second through-hole 12, but the present invention is not limited thereto. For example, the size of the exposed portion 15 may be smaller than the size of the second through-hole 12.

Embodiment 3

A filter of Embodiment 3 according to the present invention will be described.

In Embodiment 3, differences from Embodiment 2 will be mainly described. In Embodiment 3, the same or equivalent components as those in Embodiment 2 will be denoted by the same reference signs. Further, in Embodiment 3, the description that overlaps that of Embodiment 2 will be omitted.

Embodiment 3 is different from Embodiment 2 in that the support portion includes a reinforcement portion.

Figure 15:
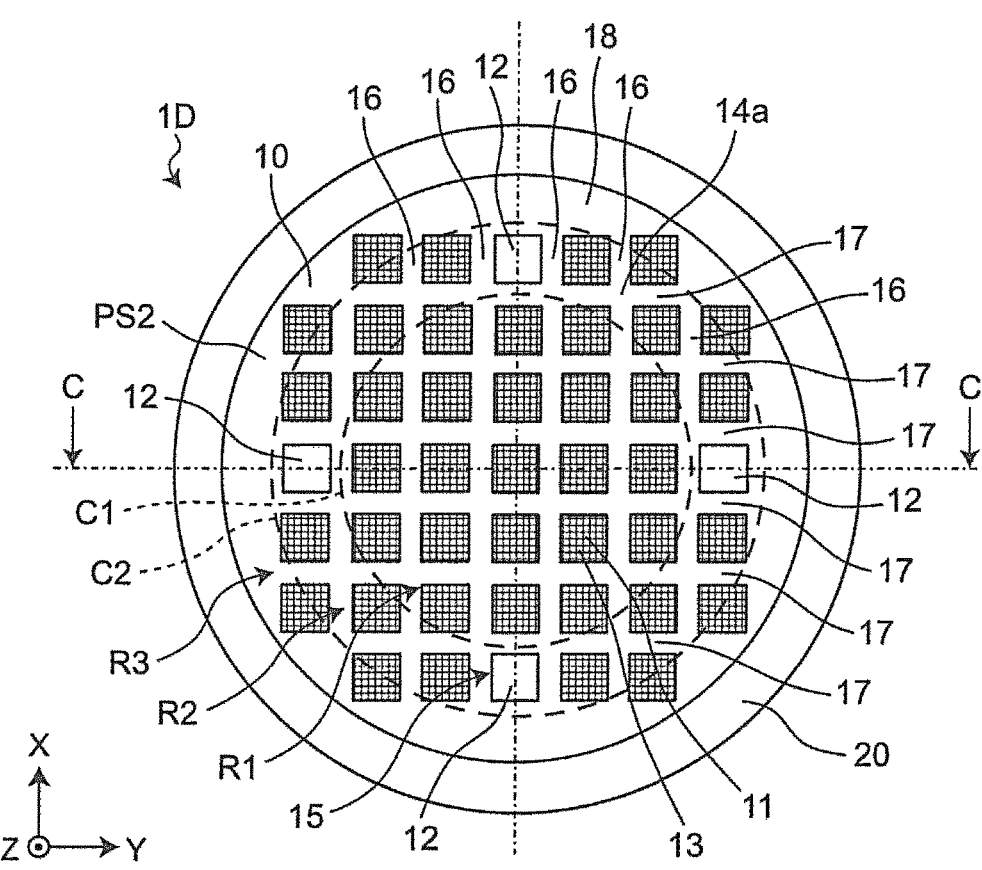
FIG. 15 is a schematic view of an example of a filter of Embodiment 3 according to the present invention.
Figure 16:
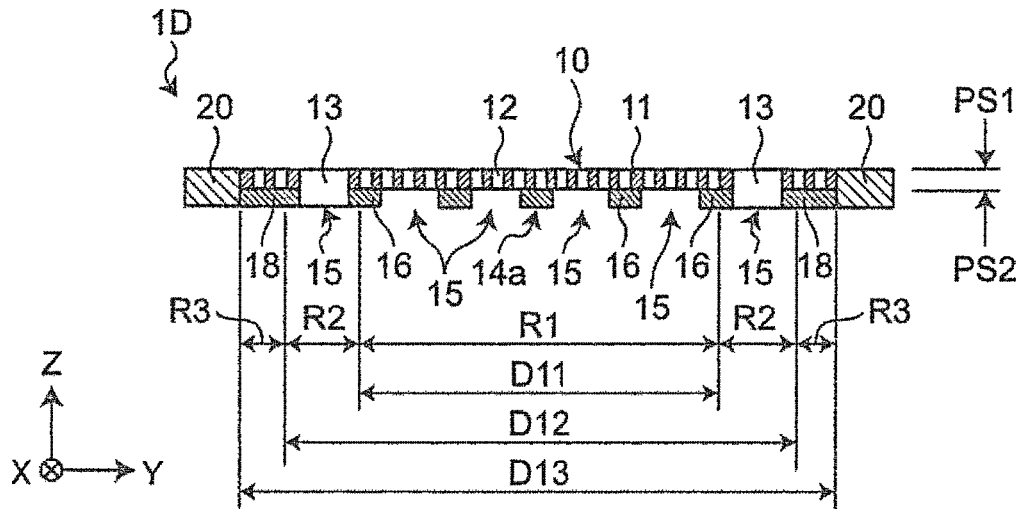
FIG. 16 is a schematic sectional view of the filter in FIG. 15 taken along line C-C.

FIG. 15 is a schematic view of an example of a filter 1D of Embodiment 3 according to the present invention. FIG. 16 is a schematic sectional view of the filter 1D in FIG. 15 taken along line C-C. As illustrated in FIG. 15 and FIG. 16, in the filter 1D, a support portion 14*a* includes a reinforcement portion 18 in the third region R3 of the filter portion 10.

The reinforcement portion 18 is disposed in the third region R3 of the second main surface PS2 of the filter portion 10. The reinforcement portion 18 is connected to the multiple first support portions 16 and the multiple second support portions 17. In Embodiment 3, the reinforcement portion 18 surrounds a portion where the multiple first support portions 16 and the multiple second support portions 17 are formed. For example, the reinforcement portion 18 has an annular shape.

An opening ratio of the reinforcement portion 18 is less than an opening ratio of a portion disposed in the first region R1 and the second region R2 of the support portion 14*a*. Note that the opening ratio is calculated by (area of through-holes)/(projected area of the support portion 14*a* assuming that the through-holes are not formed), when the support portion 14*a* is viewed from the side of the second main surface PS2. The opening ratio of the reinforcement portion 18 means an opening ratio of a portion disposed in the third region R3 of the support portion 14*a*. The opening ratio of the portion disposed in the first region R1 and the second region R2 means an opening ratio of a portion formed by the multiple first support portions 16 and the multiple second support portions 17.

The opening ratio of the reinforcement portion 18 is 3% to 55%. In contrast, the opening ratio of the portion formed by the multiple first support portions 16 and the multiple second support portions 17 is 3% to 15%.

For example, the reinforcement portion 18 is formed of a plate-shaped member. The reinforcement portion 18 is integrally formed with the first support portion 16 and the second support portion 17. For example, a thickness of the reinforcement portion 18 is equal to a thickness of the first support portion 16 and the second support portion 17.

Effects

With the use of the filter 1D according to Embodiment 3, the following effects may be achieved.

In the filter 1D, the support portion 14*a* includes the reinforcement portion 18 connected to the multiple first support portions 16 and the multiple second support portions 17 in the third region R3 of the second main surface PS2. The opening ratio of the reinforcement portion 18 is less than the opening ratio of the portion formed by the multiple first support portions 16 and the multiple second support portions 17 disposed in the first region R1 and the second region R2.

With the configuration above, durability of the filter 1D may further be increased. In an outer periphery side region of the filter 1A, stress is more likely to be applied than in a center side region. With the use of the filter 1D, the outer periphery side region of the filter 1A may be supported by the reinforcement portion 18 disposed in the third region R3 of the filter 1A. With this, it is possible to further suppress damage to the filter portion 10 in the outer periphery side region of the filter 1A.

Note that, in Embodiment 3, an example has been described in which the reinforcement portion 18 surrounds a periphery of the portion where the multiple first support portions 16 and the multiple second support portions 17 are formed, but the present invention is not limited thereto. It is sufficient that the reinforcement portion 18 is provided in at least part of the third region R3. For example, the reinforcement portion 18 may be dispersedly provided in the third region R3.

Embodiment 4

A filter device of Embodiment 4 according to the present invention will be described.

In Embodiment 4, differences from Embodiment 1 will be mainly described. In Embodiment 4, the same or equivalent components as those in Embodiment 1 will be denoted by the same reference signs. Further, in Embodiment 4, the description that overlaps that of Embodiment 1 will be omitted.

The Embodiment 4 is different from Embodiment 1 in that multiple filters are provided.

Figure 17:
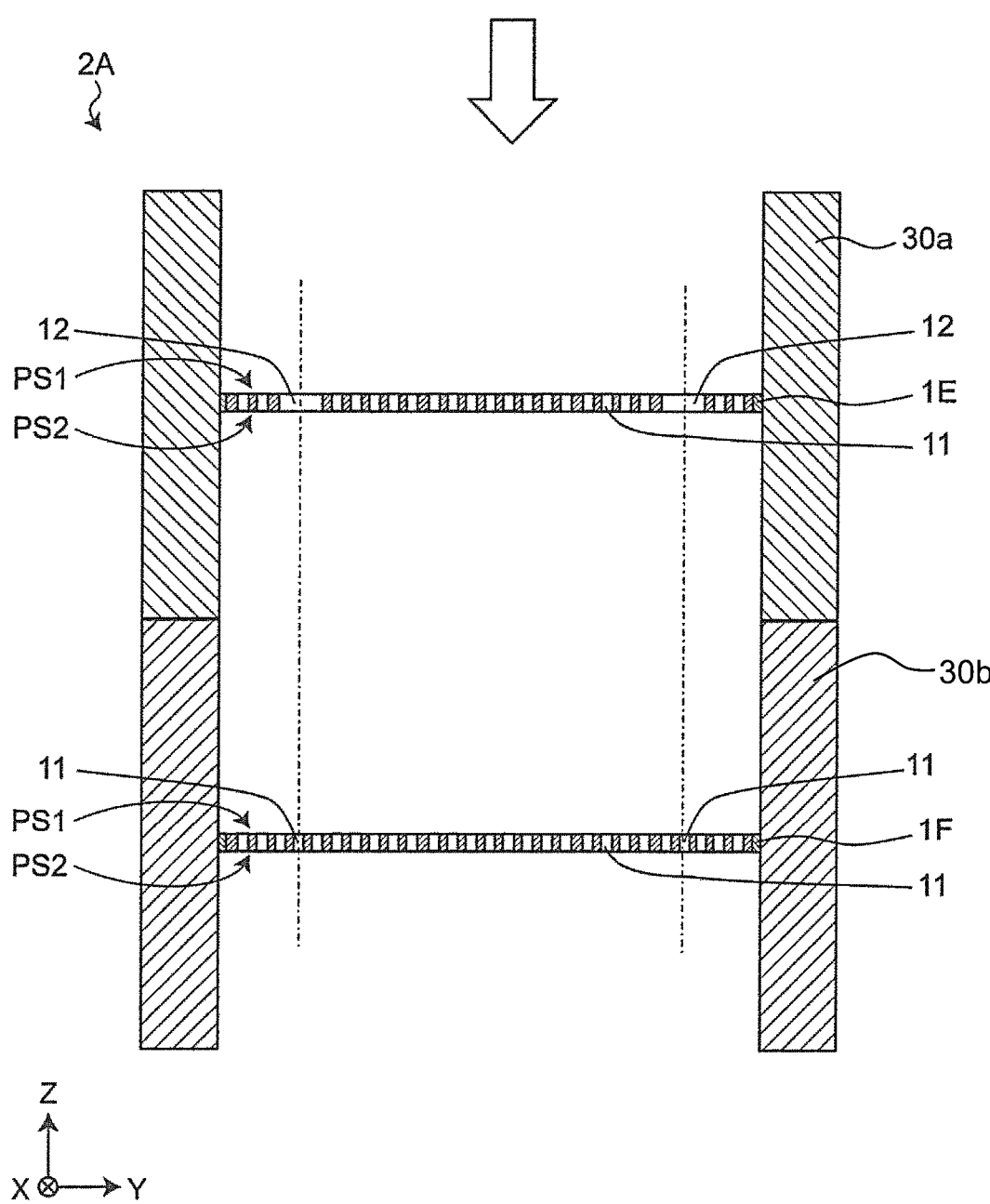
FIG. 17 is a schematic view of an example of a filter device of Embodiment 4 according to the present invention.

FIG. 17 is a schematic view of an example of a filter device 2A of Embodiment 4 according to the present invention. As illustrated in FIG. 17, the filter device 2A includes multiple filters 1E and 1F. In Embodiment 4, the multiple filters 1E and 1F include a first filter 1E and a second filter 1F. Note that, since the first filter 1E and the second filter 1F have the same configuration as that of the filter 1A of Embodiment 1, the detailed description thereof will be omitted.

The first filter 1E and the second filter 1F are disposed in series at an interval. When viewed from the direction (Z direction) in which the first filter 1E and the second filter 1F are disposed in series, the multiple second through-holes 12 of the first filter 1E do not overlap the multiple second through-holes 12 of the second filter 1F.

For example, when the filter device 2A is viewed from the height direction (Z direction), each of the multiple second through-holes 12 of the first filter 1E is positioned between the multiple second through-holes 12 of the second filter 1F. For example, when viewed from the Z direction, the multiple second through-holes 12 of the first filter 1E are shifted by 45° against the multiple second through-holes 12 of the second filter 1F with a center of the filter device 2A as a reference.

The filter device 2A includes a first holding portion 30*a* that holds the first filter 1E and a second holding portion 30*b* that holds the second filter 1F. The first holding portion 30*a* and the second holding portion 30*b* are detachably attached. Specifically, the first holding portion 30*a* and the second holding portion 30*b* may be attached to pile up in the height direction (Z direction) of the filter device 2A. Note that, since the first holding portion 30*a* and the second holding portion 30*b* have the same configuration as that of the holding portion 30 of Embodiment 1 except that an attachment mechanism capable of being detached is provided, the detailed description thereof will be omitted.

For example, as the attachment mechanism of the first holding portion 30a and the second holding portion 30b, there may be adopted a screw mechanism, or an engagement mechanism with a projecting portion and a recessed portion.

In Embodiment 4, the first holding portion 30a is disposed on the second holding portion 30b. With this, the first filter 1E is disposed upstream side of the second filter 1F.

Effects

With the use of the filter device 2A according to Embodiment 4, the following effects may be achieved.

The filter device 2A includes the first filter 1E and the second filter 1F disposed in series with the first filter 1E at an interval. When viewed from the direction (Z direction) in which the first filter 1E and the second filter 1F are disposed in series, the multiple second through-holes 12 of the first filter 1E do not overlap the multiple second through-holes 12 of the second filter 1F.

With the configuration above, filtration may be performed by the first filter 1E and the second filter 1F. With this, it is possible to increase durability of the filter device 2A while further suppressing a decrease in a collection rate of a filtration object.

Further, since the multiple second through-holes 12 of the first filter 1E and the multiple second through-holes 12 of the second filter 1F do not overlap, it becomes likely that a filtration object is captured by the second filter 1F. With this, it is possible to further suppress a decrease in a collection rate of a filtration object.

Note that, in Embodiment 4, an example has been described in which the filter device 2A includes two filters 1E and 1F, but the present invention is not limited thereto. The filter device 2A may include two or more filters.

In Embodiment 4, an example has been described in which the first filter 1E and the second filter 1F have the same configuration as that of the filter 1A of Embodiment 1, but the present invention is not limited thereto. For example, the first filter 1E and the second filter 1F may be the filter of Embodiment 2 and Embodiment 3.

In Embodiment 4, an example has been described in which the multiple second through-holes 12 are provided in the first filter 1E and the second filter 1F, but the present invention is not limited thereto. It is sufficient that the one or multiple second through-holes 12 are provided in the first filter 1E and the second filter 1F.

In Embodiment 4, in the first filter 1E and the second filter 1F, the first through-holes 11 and/or the second through-holes 12 may be different from each other or the same.

EXAMPLE

Example 1 to Example 5 and Comparative Example 1 to Comparative Example 5 will be described.

Example 1

In Example 1, filtration was performed using a filter device including the filter 1C of Embodiment 2.

An outer shape of the filter 1C used in Example 1 has a circular shape with a diameter of 6 mm. The thickness T of the filter portion 10 is 1.0 μm. The first through-hole 11 has the side D1 of 4.5 μm and the hole pitch P1 of 6.5 μm. The second through-hole 12 has the side D2 of 240 μm. The exposed portion 15 has the side D3 of 240 μm and the pitch P2 of 260 μm. The width W1 of the first support portion 16 and the second support portion 17 is 20 μm. The thickness of the support portion 14 is 15 μm. The filter 1C is made of nickel.

The holding portion 30 is formed of polyacetal having an outer diameter of 14 mm and a thickness of 3 mm. Further, the flow path sectional shape of the first flow path 33 and the second flow path 34 of the holding portion 30 is a circle with a diameter of 6 mm. A flow path length of the first flow path 33 is 1.5 mm. A flow path length of the second flow path 34 is 1.5 mm.

Comparative Example 1

In Comparative Example 1, filtration was performed using a filter device including a filter having no second through-holes.

Figure 18:
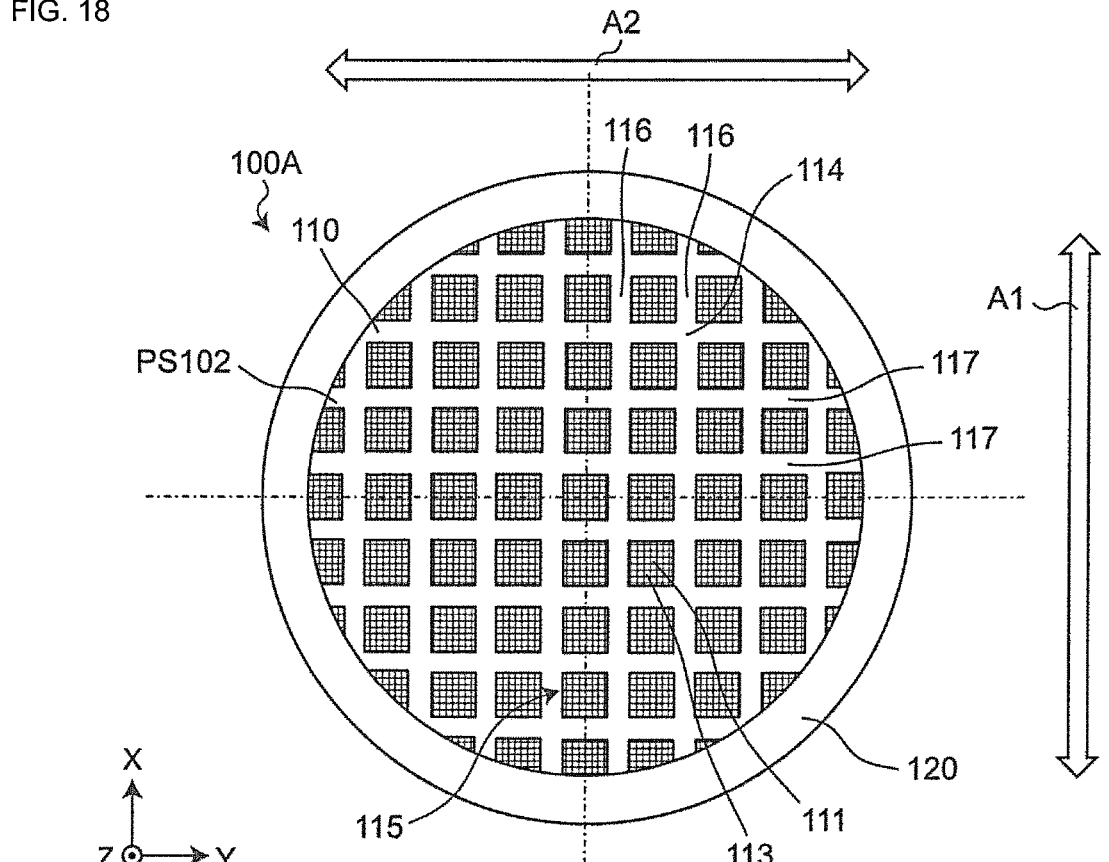
FIG. 18 is a schematic view of a filter of Comparative Example 1.

FIG. 18 is a schematic view of a filter 100A of Comparative Example 1. As illustrated in FIG. 18, the filter 100A has the same configuration as that of the filter 1C of Example 1 except that the second through-holes are not provided. Specifically, the filter 100A includes a filter portion 110 and a frame portion 120 disposed on an outer periphery of the filter portion 110. The filter portion 110 includes a filter base portion 113 provided with multiple first through-holes 111. A support portion 114 is disposed on the side of the second main surface PS102 of the filter portion 110. The support portion 114 includes multiple first support portions 116 extending in the first direction A1 and disposed at intervals and multiple second support portions 117 extending in the second direction A2 that intersects the first direction A1, disposed at intervals, and being connected to the multiple first support portions 116. When viewed from the side of the second main surface of the filter 100A, multiple exposed portions 115 exposed from the support portion 114 are formed in the filter base portion 113.

In Example 1 and Comparative Example 1, a PBS solution containing Hera cells with a diameter of approximately 13 μm at a concentration of $10^4$ cells/mL was flowed through using a syringe pump at a flow rate of 20 mL/min. In Example 1 and Comparative Example 1, a change in pressure loss due to the Hera cells captured on the first main surface of the filter was measured as a function of the number of input cells (=liquid flow amount×cell number concentration).

Figure 19:
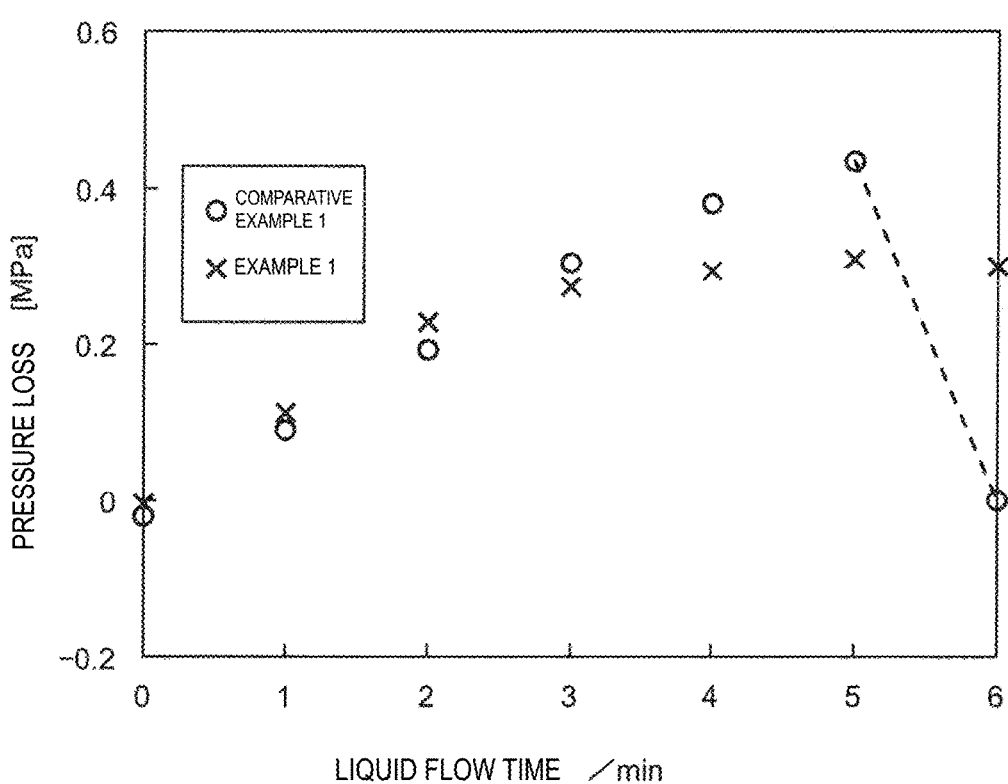
FIG. 19 is a graph illustrating an example of a measurement result of pressure loss in Example 1 and Comparative Example 1.

FIG. 19 is a graph illustrating an example of a measurement result of pressure loss in Example 1 and Comparative Example 1. Note that the pressure loss was expressed in arbitrary unit (arb. unit). In Comparative Example 1, the pressure loss increased as the number of input cells increased, and the filter 100A was ruptured when the number of input cells reached approximately $2.1×10^5$ [cells]. Whereas, in Example 1, although the pressure loss increased as the number of input cells increased, it was found that the pressure loss gradually approached a substantially constant value (approximately 70% of the rupture pressure loss in Comparative Example 1) from the point in which the number of input cells was around $1.5×10^5$ [cells]. From the result above, it is found that in Example 1, compared to Comparative Example 1, the increase in the pressure loss was suppressed to the rupture pressure value or less of the filter.

Example 2

In Example 2, filtration was performed using the same filter device as that of Example 1.

Comparative Example 2

In Comparative Example 2, filtration was performed using a filter device including a filter in which multiple second through-holes were provided in the third region R3.

Figure 20:
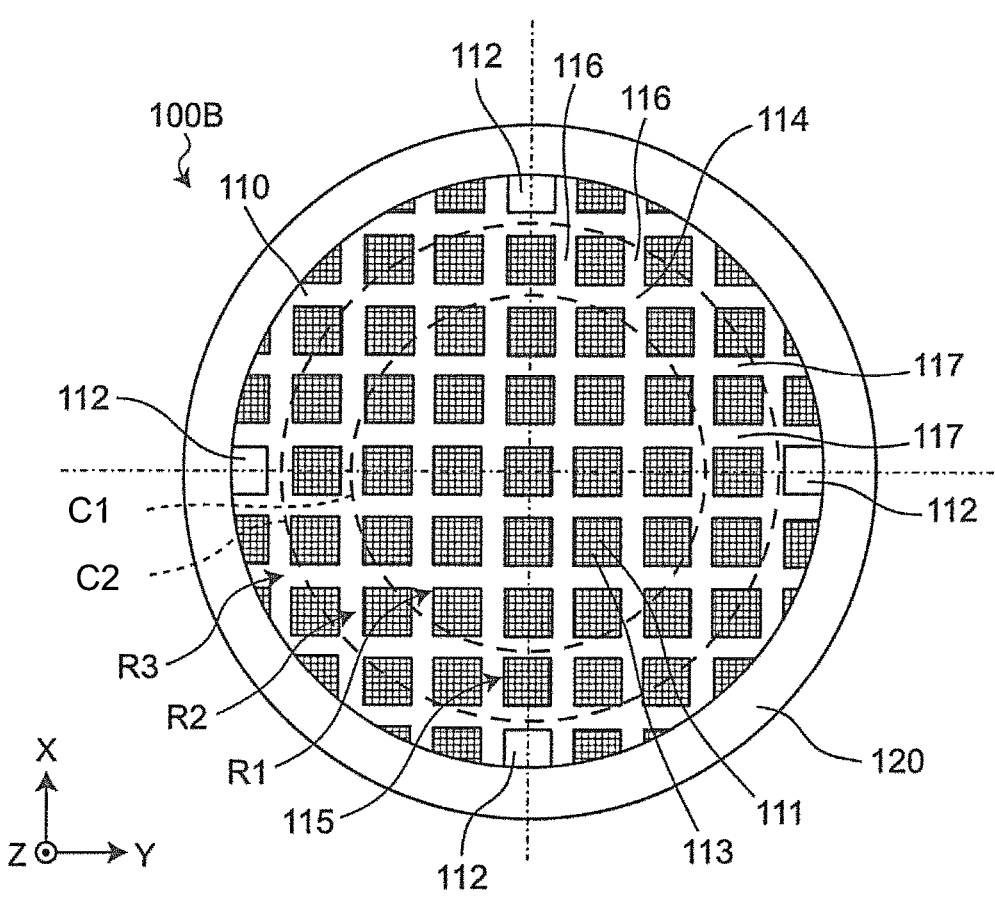
FIG. 20 is a schematic view of a filter of Comparative Example 2.

FIG. 20 is a schematic view of a filter 100B of Comparative Example 2. As illustrated in FIG. 20, the filter 100B has the same configuration as the filter 1C of Example 2 except that multiple second through-holes 112 are provided in the third region R3. In Comparative Example 2, in the third region R3, four second through-holes 112 are symmetrically arranged with respect to a center of the filter 100B.

In Example 2 and Comparative Example 2, a change in pressure loss due to the Hera cells captured on the first main surface of the filter was measured as a function of the number of input cells (=liquid flow amount×cell number concentration), in the same manner as in Example 1 and Comparative Example 1. Note that, in Example 2 and Comparative Example 2, the pressure loss was measured at intervals of 30 seconds.

Figure 21:
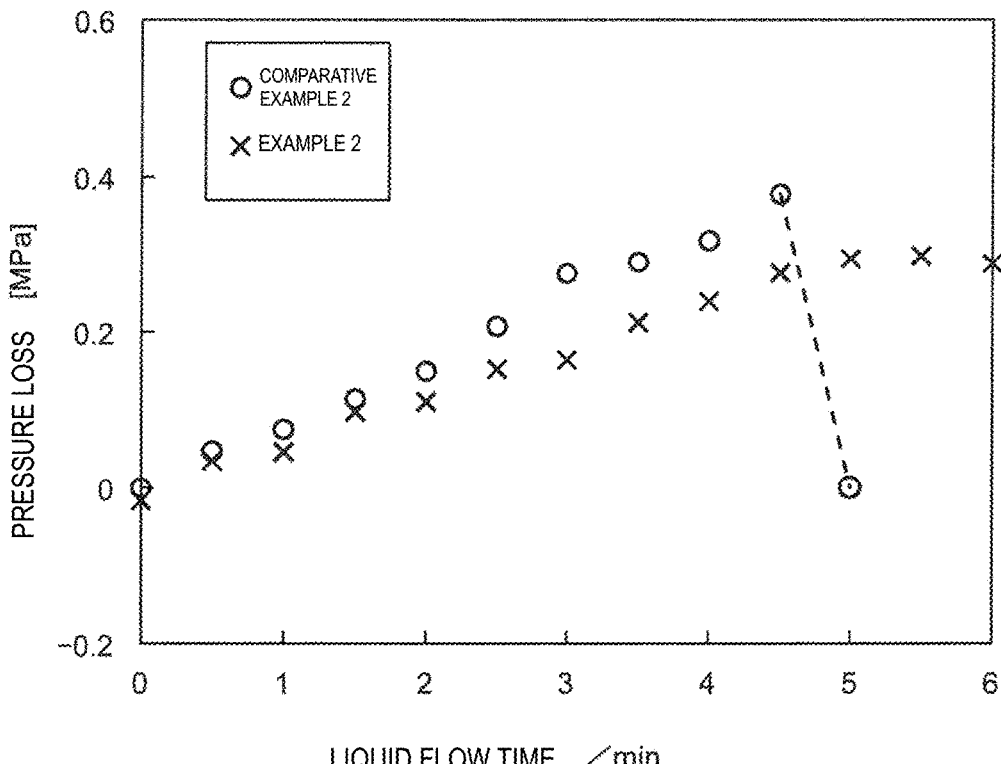
FIG. 21 is a graph illustrating an example of a measurement result of pressure loss in Example 2 and Comparative Example 2.

FIG. 21 is a graph illustrating an example of a measurement result of pressure loss in Example 2 and Comparative Example 2. Note that the pressure loss was expressed in arbitrary unit (arb. unit). In Comparative Example 2, the pressure loss increased as the number of input cells increased, and the filter 100A was ruptured when the number of input cells reached approximately $2.1×10^5$ [cells]. Whereas, in Example 2, although the pressure loss increased as the number of input cells increased, it was found that the pressure loss gradually approached a substantially constant value (approximately 90% of the rupture pressure loss in Comparative Example 2) from the point in which the number of input cells was around $1.5×10^5$ [cells]. From the result above, it is found that in Example 2, compared to Comparative Example 2, an increase in the pressure loss was suppressed to the rupture pressure value or less of the filter.

Example 3

In Example 3, filtration was performed using the same filter device as that of Example 1.

Comparative Example 3

In Comparative Example 3, filtration was performed using a filter device including a filter in which multiple second through-holes were provided in the first region R1.

Figure 22:
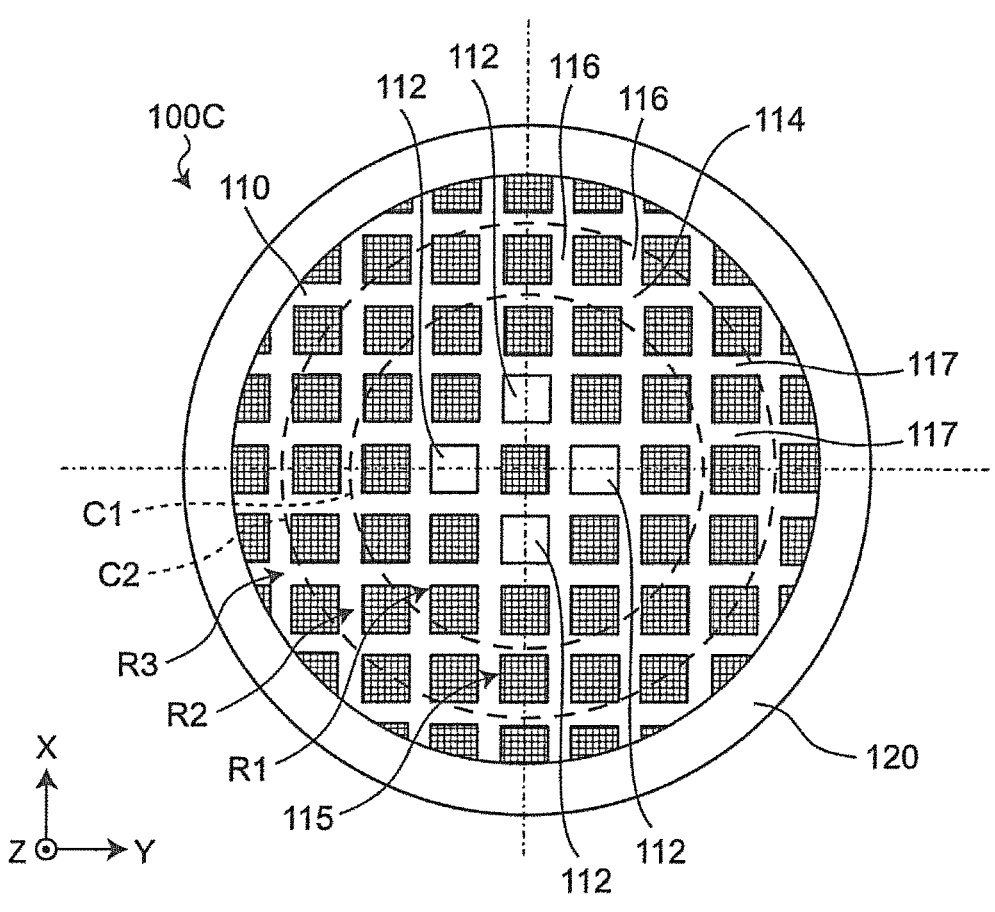
FIG. 22 is a schematic view of a filter of Comparative Example 3.

FIG. 22 is a schematic view of a filter 100C of Comparative Example 3. As illustrated in FIG. 22, the filter 100C has the same configuration as the filter 1C of Example 2 except that the multiple second through-holes 112 are provided in the first region R1. In Comparative Example 3, in the first region R1, the four second through-holes 112 are symmetrically arranged relative to a center of the filter 100C.

In Example 3 and Comparative Example 3, a change in pressure loss due to the Hera cells captured on the first main surface of the filter was measured as a function of the number of input cells (=liquid flow amount×cell number concentration), in the same manner as in Example 1 and Comparative Example 1.

Figure 23:
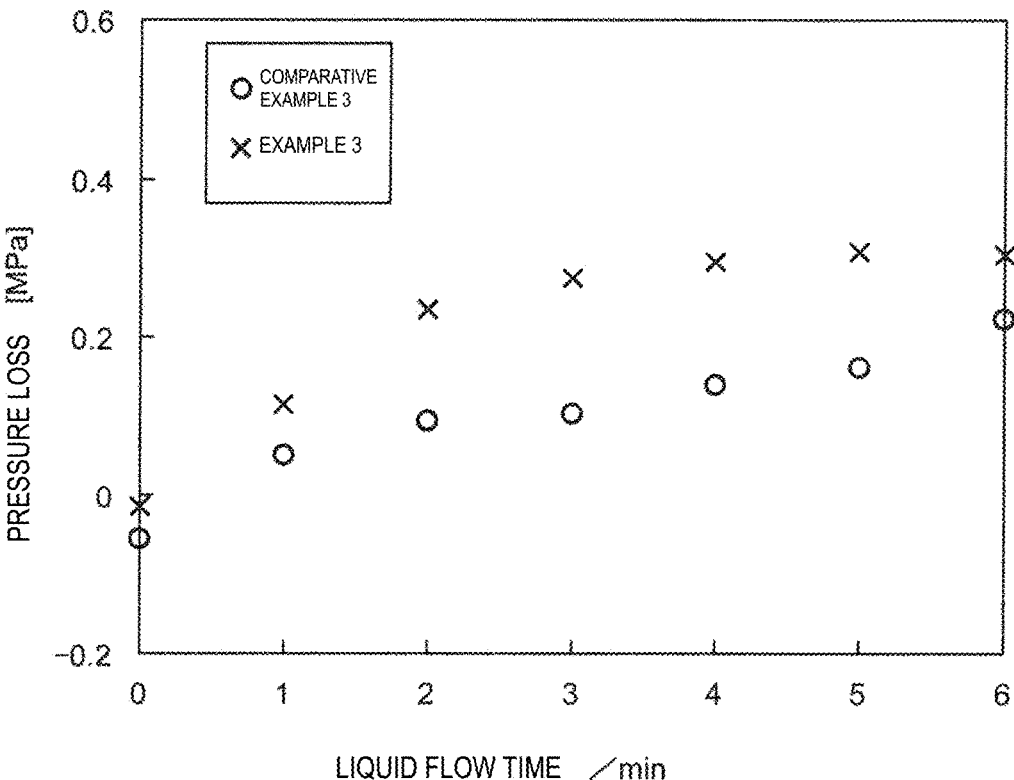
FIG. 23 is a graph illustrating an example of a measurement result of pressure loss in Example 3 and Comparative Example 3.

FIG. 23 is a graph illustrating an example of a measurement result of pressure loss in Example 3 and Comparative Example 3. Note that the pressure loss was expressed in arbitrary unit (arb. unit). In Comparative Example 3, it was found that the pressure loss was lower than that in Example 1, and a rupture did not occur even when the number of input cells was increased to more than approximately $2.1×10^5$

[cells] in which a rupture occurred in Comparative Example 1 and Comparative Example 2.

In Example 3 and Comparative Example 3, there were collected the filter 1C and the filter 100C of which the number of input cells was approximately $2.1×10^5$ [cells], and the Hera cells captured on the filter 1C and the filter 100C were observed under an optical microscope. In Comparative Example 3, a portion that captured the Hera cells was small in an outer periphery side region of the filter 100C. In contrast, in Example 3, almost an entire surface of the filter 1C except the multiple second through-holes 12 captured the cells.

Further, after the observation, the filter 1C and the filter 100C were immersed in a mixed solution of an ATP assay reagent (manufactured by TOYO B-Net Co., Ltd.) of 1 mL and PBS of 1 mL, and were shaken approximately 10 minutes at a room temperature while shielding from light. After the shaking, ATP was extracted from the Hera cells captured on the filter 1C and the filter 100C, and a firefly luciferase luminescence reaction was performed. The solution after the reaction was transferred to an observation well, and the amount of luminescence was measured with an ATP assay device (manufactured by Churitsu Electric Corporation). Further, five types of Hera cell solutions with known concentrations were prepared, and a calibration curve of the number of cells and the amount of luminescence was created. As a result of the ATP assay, it was found that the Hera cells of $1.4×10^5$ [cells] were captured in Comparative Example 3, and the Hera cells of $1.9×10^5$ [cells] were captured in Example 3. That is, it was found that in Example 3, approximately 1.4 times as many Hera cells as in Comparative Example 3 were captured. From the result above, it was found that in Comparative Example 3, since the cell collection efficiency lowered, a state that the pressure loss increased did not occur even when the number of input cells was increased.

Example 4

In Example 4, filtration was performed using the same filter device as that of Example 1.

Comparative Example 4

In Comparative Example 4, filtration was performed using a filter device including a filter provided with second through-holes smaller than first through-holes.

Figure 24:
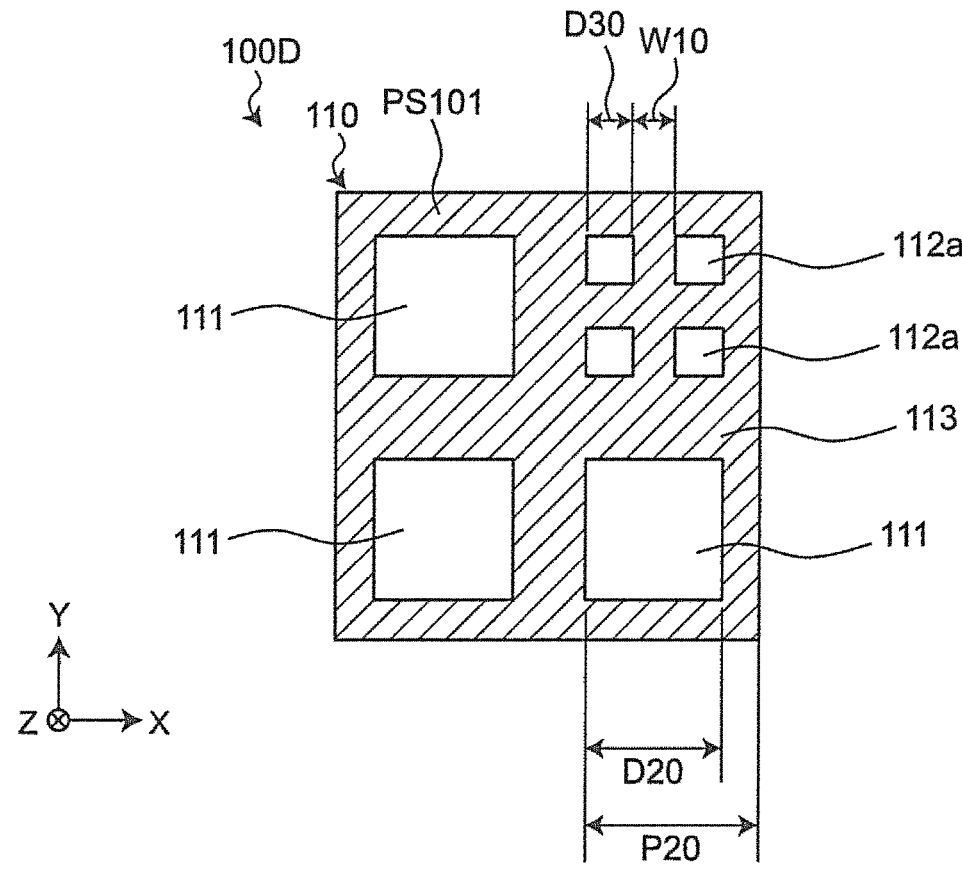
FIG. 24 is a schematic view of a portion in which a second through-hole is provided in a filter portion of Comparative Example 4.

FIG. 24 is a schematic perspective view of a portion where second through-holes 112a are provided in the filter portion 110 of Comparative Example 4. As illustrated in FIG. 24, a filter 100D of Comparative Example 4 is provided with the multiple second through-holes 112a smaller in size than the first through-holes 111. The filter 100D has the same configuration as that of Example 4 except that the second through-hole 112a is smaller than the first through-hole 111. In Comparative Example 4, four second through-holes 112a are provided at a position where the one second through-hole 12 of Example 4 is provided. Specifically, in Comparative Example 4, the four second through-holes 112a are provided in a 2×2 grid.

In Comparative Example 4, a side D20 of the first through-hole 111 is 14 μm, and a hole pitch P20 is 20 μm. A thickness of the filter portion 110 is 1.0 μm. A side D30 of the second through-hole 112a is 4.5 μm. A width W10 of the filter base portion 113 delimiting the second through-hole 112a is 5 μm.

In Comparative Example 4, the first through-hole 111 is larger than the Hera cell with the diameter of approximately 13 μm, but the second through-hole 112a is smaller than the Hera cell.

In Example 4 and Comparative Example 4, a change in pressure loss due to the Hera cells captured on the first main surface of the filter was measured as a function of the number of input cells (=liquid flow amount×cell number concentration), in the same manner as in Example 1 and Comparative Example 1.

Figure 25:
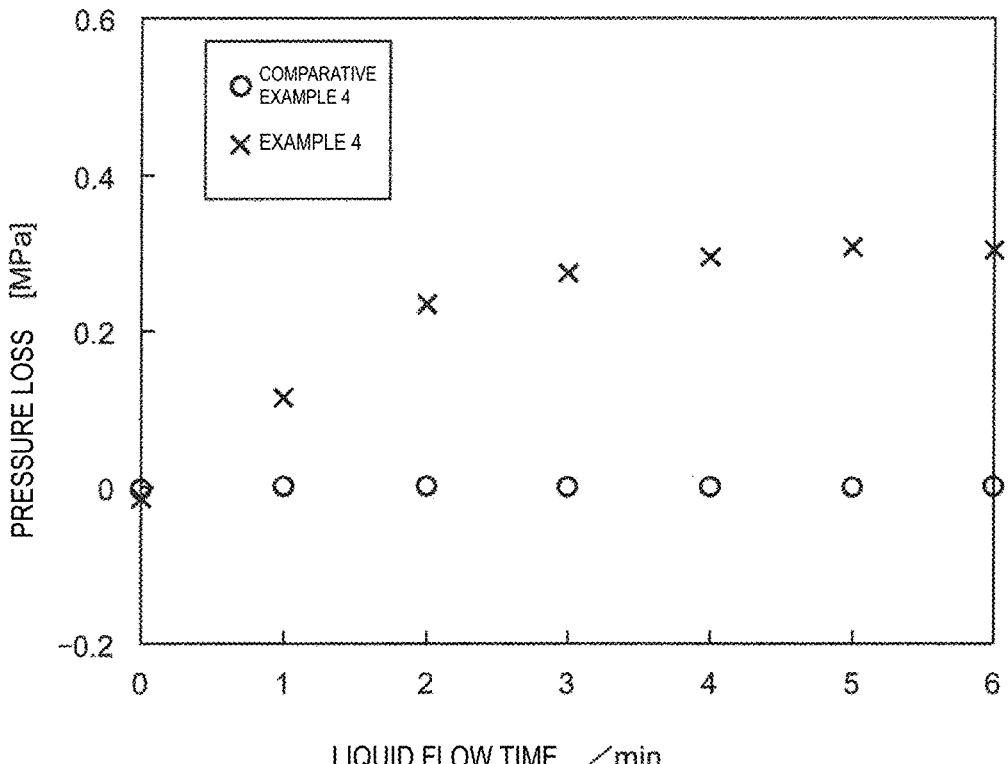
FIG. 25 is a graph illustrating an example of a measurement result of pressure loss in Example 4 and Comparative Example 4.

FIG. 25 is a graph illustrating an example of a measurement result of pressure loss in Example 4 and Comparative Example 4. Note that the pressure loss was expressed in arbitrary unit (arb. unit). As illustrated in FIG. 25, Comparative Example 4 exhibits a value of approximately 0 regardless of the liquid flow time. In Example 4 and Comparative Example 4, after the liquid flow for the input cells of approximately $2.5 \times 10^5$ [cells], the filter 1C and the filter 100D were collected. The collected filter 1C and filter 100D were immersed in a mixed solution of an ATP assay reagent (manufactured by TOYO B-Net Co., Ltd.) of 1 mL and PBS of 1 mL, and were shaken approximately 10 minutes at a room temperature while shielding from light. After shaking, ATP was extracted from the Hera cells captured on the filter 1C and the filter 100D, and a firefly luciferase luminescence reaction was performed. The solution after the reaction was transferred to an observation well, and the amount of luminescence was measured with an ATP assay device (manufactured by Churitsu Electric Corporation). Further, five types of Hera cell solutions with known concentrations were prepared, and a calibration curve of the number of cells and the amount of luminescence was created. As a result of the ATP assay, it was found that Hera cells of $0.9 \times 10^4$ [cells] were captured in Comparative Example 4, and the Hera cells of $1.9 \times 10^5$ [cells] were captured in Example 4. In Example 4, it was found that the large amount of the Hera cells, which was approximately 210 times as many as those in Comparative Example 4, were captured.

Example 5

In Example 5, filtration was performed using the same filter device as that of Example 1.

Comparative Example 5

In Comparative Example 5, filtration was performed using a filter device including a filter having the same configuration as in Comparative Example 4 except that the sizes of the first through-hole and the second through-hole were different from those of Comparative Example 4.

Comparative Example 5 is different from Comparative Example 4 in that the first through-hole 111 is smaller than the Hera cell with the diameter of approximately 13 μm.

In Comparative Example 5, the side D20 of the first through-hole 111 is 7 μm, and the hole pitch P20 is 10 μm. The thickness of the filter portion 110 is 1.0 μm. The side D30 of the second through-hole 112a is 2.25 μm. The width W10 of the filter base portion 113 delimiting the second through-hole 112a is 2.5 μm.

In Example 5 and Comparative Example 5, a change in pressure loss due to the Hera cells captured on the first main surface of the filter was measured as a function of the number of input cells (=liquid flow amount×cell number concentration), in the same manner as in Example 1 and Comparative Example 1.

Figure 26:
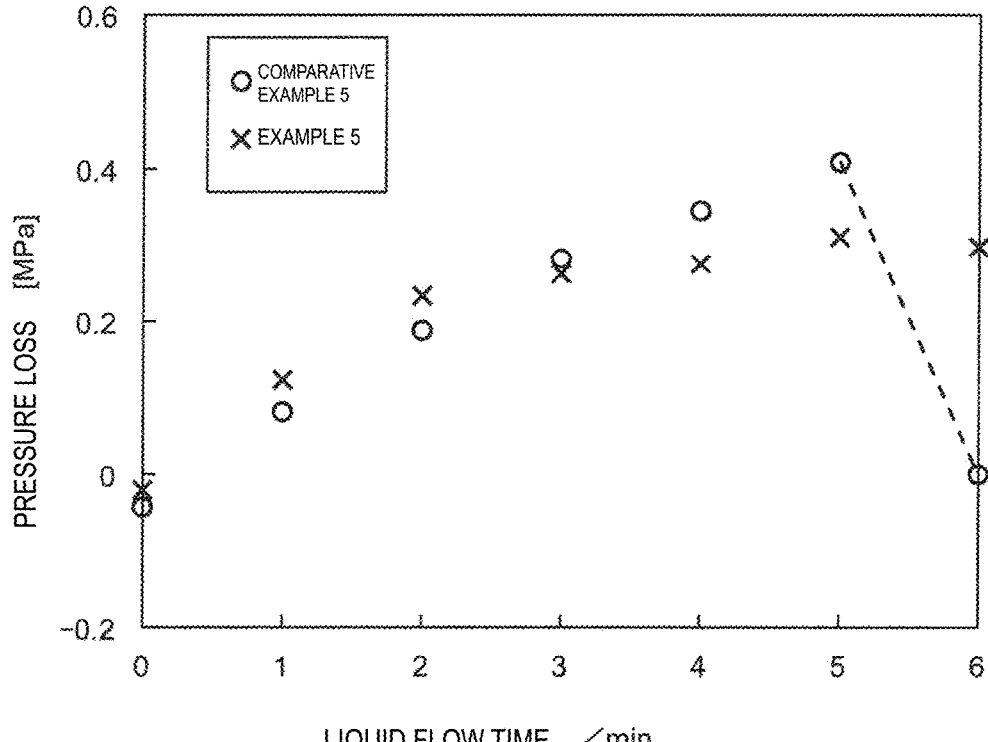
FIG. 26 is a graph illustrating an example of a measurement result of pressure loss in Example 5 and Comparative Example 5.

FIG. 26 is a graph illustrating an example of a measurement result of pressure loss in Example 5 and Comparative Example 5. Note that the pressure loss was expressed in arbitrary unit (arb. unit). As illustrated in FIG. 26, it was found that in Comparative Example 5, as the number of input cells increased, the pressure loss increased, and the filter was ruptured when the number of input cells was approximately $2.5 \times 10^5$ [cells]. From the result above, in Comparative Example 5, it was found that the rupture of the filter due to an increase in pressure loss could not be prevented unless the size of a filtration object and sizes of the through-holes of the filter were controlled as in Example 4.

While the present invention has been fully described in connection with the preferred embodiments thereof with reference to the accompanying drawings, various changes and modifications are apparent to those skilled in the art. Such changes and modifications are to be understood as being included within the scope of the present invention as defined by the appended claims unless departing therefrom.

The filter and the filter device of the present invention are useful for an application of filtering a liquid containing a filtration object.

REFERENCE SIGNS LIST 1A, 1B, 1C, 1D, 1E, 1F FILTER
2, 2A FILTER DEVICE
10 FILTER PORTION
11 FIRST THROUGH-HOLE
12 SECOND THROUGH-HOLE
13 FILTER BASE PORTION
14 SUPPORT PORTION
15 EXPOSED PORTION
16 FIRST SUPPORT PORTION
17 SECOND SUPPORT PORTION
18 REINFORCEMENT PORTION
20 FRAME PORTION
30 HOLDING PORTION
30a FIRST HOLDING PORTION
30b SECOND HOLDING PORTION
31 FIRST FLOW PATH MEMBER
32 SECOND FLOW PATH MEMBER
33 FIRST FLOW PATH
34 SECOND FLOW PATH
41 FIRST TUBE
42 FIRST TUBE FLOW PATH
43 SECOND TUBE
44 SECOND TUBE FLOW PATH
50 FILTRATION OBJECT
100A, 100B, 100C, 100D FILTER
110 FILTER PORTION
111 FIRST THROUGH-HOLE
112, 112a SECOND THROUGH-HOLE
113 FILTER BASE PORTION
114 SUPPORT PORTION
115 EXPOSED PORTION
116 FIRST SUPPORT PORTION
117 SECOND SUPPORT PORTION
120 FRAME PORTION
A1 FIRST DIRECTION
A2 SECOND DIRECTION
PS1, PS101 FIRST MAIN SURFACE

PS2, PS102 SECOND MAIN SURFACE
R1 FIRST REGION
R2 SECOND REGION
R3 THIRD REGION
C1, C2 VIRTUAL CIRCLE

The invention claimed is:

1. A filter comprising:
   a filter base portion having a first main surface and a second main surface opposite to the first main surface, the filter base portion defining multiple first through-holes penetrating between the first main surface and the second main surface and one or multiple second through-holes penetrating between the first main surface and the second main surface, the one or multiple second through-holes being larger in size than the multiple first through-holes,
   the filter base portion having a first region positioned on a center side of a filter, a second region positioned on an outer periphery side of the filter relative to the first region and positioned on the center side relative to an outer periphery of the filter, and a third region positioned between the second region and the outer periphery of the filter,
   the one or multiple second through-holes are provided in the second region, and
   a ratio of an opening area of the one or multiple second through-holes is $2\times10^{-5}$ times to 0.1 times a ratio of an opening area of the multiple first through-holes,
   wherein the filter has a circular shape having a center point,
   the first region has a circular shape centered on the center point of the filter,
   the second region has an annular shape centered on the center point of the filter, and
   an outer diameter of the second region is 0.11 times to 0.84 times a diameter of the filter.

2. The filter according to claim 1, wherein the ratio of the opening area of the one or multiple second through-holes is $6\times10^{-6}$ times to 0.2 times the ratio of the opening area of the multiple first through-holes.

3. The filter according to claim 1, wherein the ratio of the opening area of the one or multiple second through-holes is $2\times10^{-5}$ times to 0.1 times the ratio of the opening area of the multiple first through-holes.

4. The filter according to claim 1, wherein a ratio of an area of the first region is greater than a ratio of an area of the second region, and the ratio of the area of the first region is greater than a ratio of an area of the third region.

5. The filter according to claim 1, wherein the multiple second through-holes are positioned so as to sandwich the multiple first through-holes.

6. The filter according to claim 1, wherein the multiple second through-holes are symmetrically arranged relative to the first region.

7. The filter according to claim 1, further comprising:
   a support portion on the second main surface and supporting the filter base portion,
   wherein the support portion includes
      multiple first support portions extending in a first direction and disposed at intervals, and
      multiple second support portions extending in a second direction that intersects the first direction, disposed at intervals, and connected to the multiple first support portions such that multiple exposed portions exposed from the support portion are formed in the filter base portion when viewed from a side of the second main surface of the filter, and
   the one or multiple second through-holes are in the multiple exposed portions in the second region.

8. The filter according to claim 7, wherein the second direction is orthogonal to the first direction.

9. The filter according to claim 7,
   wherein the support portion includes a reinforcement portion connected to the multiple first support portions and the multiple second support portions in the third region of the second main surface, and
   an opening ratio of the reinforcement portion is less than an opening ratio of a portion formed by the multiple first support portions and the multiple second support portions in the first region and the second region.

10. The filter according to any claim 1, wherein an opening ratio of the third region is less than an opening ratio of each of the first region and the second region.

11. The filter according to claim 1, wherein the filter is a metal porous film.

12. The filter according to claim 1, further comprising:
   a frame portion on the outer periphery of the filter base portion.

* * * * *